US010919405B2

(12) United States Patent
Moravick et al.

(10) Patent No.: US 10,919,405 B2
(45) Date of Patent: Feb. 16, 2021

(54) LIGHT ELECTRIC VEHICLE PARKING AND CHARGING STATIONS AND SMART CHARGING SYSTEMS FOR THE VEHICLE BATTERIES

(71) Applicant: Swiftmile, Inc., Mountain View, CA (US)

(72) Inventors: Keith Edward Moravick, Mountain View, CA (US); Colin Roche, San Mateo, CA (US); Leandro Vera, Hayden, ID (US); Douglas Ralph Schaller, San Carlos, CA (US); George Pontis, Redwood City, CA (US)

(73) Assignee: Swiftmile, Inc., Mountain View, CA (US)

( * ) Notice: Subject to any disclaimer, the term of this patent is extended or adjusted under 35 U.S.C. 154(b) by 0 days.

(21) Appl. No.: 16/523,969

(22) Filed: Jul. 26, 2019

(65) Prior Publication Data

US 2020/0031247 A1    Jan. 30, 2020

Related U.S. Application Data

(60) Provisional application No. 62/828,313, filed on Apr. 2, 2019, provisional application No. 62/703,607, filed on Jul. 26, 2018.

(51) Int. Cl.
| *B60L 53/31* | (2019.01) |
| *B60L 53/51* | (2019.01) |
| *B60L 53/53* | (2019.01) |
| *B60L 53/62* | (2019.01) |
| *B60L 53/66* | (2019.01) |

(Continued)

(52) U.S. Cl.
CPC .............. *B60L 53/31* (2019.02); *B60L 53/51* (2019.02); *B60L 53/53* (2019.02); *B60L 53/62* (2019.02); *B60L 53/65* (2019.02); *B60L 53/66* (2019.02); *H02J 7/0027* (2013.01); *B60L 2200/24* (2013.01); *H02J 7/00034* (2020.01)

(58) Field of Classification Search
CPC .......... B60L 53/16; B60L 53/18; B60L 53/31
USPC ....................................................... 320/109
See application file for complete search history.

(56) References Cited

U.S. PATENT DOCUMENTS 5,553,987 A * 9/1996 Ellis ..................... B65G 69/005
                                                188/32
9,418,345 B1 * 8/2016 Meehan .................. B60L 53/68
(Continued)

FOREIGN PATENT DOCUMENTS

WO    WO2017217929    * 5/2017

*Primary Examiner* — Richard Isla
*Assistant Examiner* — Tessema Kebede
(74) *Attorney, Agent, or Firm* — Keith Kline; The Kline Law Firm PC

(57) ABSTRACT

A universal charging system is provided. In one example embodiment, the universal charging system includes a charging adapter configured to be mounted on a light electric vehicle (LEV), a charging station, and a processor configured to control charging of the LEV. The charging adapter may have electrical contacts for docking with a charging station and a charging interface for supplying power from the charging station to a battery of the LEV. The charging station may have at least one docking unit for receiving the charging adapter of the LEV. The at least one docking unit may have further electrical contacts for connecting to the charging adapter of the LEV.

14 Claims, 33 Drawing Sheets

(51) Int. Cl.
*H02J 7/00* (2006.01)
*B60L 53/65* (2019.01)

(56) References Cited

U.S. PATENT DOCUMENTS

| | | | |
|---|---|---|---|
| 2010/0228405 A1* | 9/2010 | Morgal | B62H 3/02 |
| | | | 701/2 |
| 2011/0025267 A1* | 2/2011 | Kamen | B60L 55/00 |
| | | | 320/109 |
| 2012/0074901 A1* | 3/2012 | Mohammed | H02J 7/045 |
| | | | 320/109 |
| 2014/0312839 A1* | 10/2014 | Uyeki | B60L 53/64 |
| | | | 320/109 |
| 2015/0054460 A1* | 2/2015 | Epstein | B60L 11/187 |
| | | | 320/109 |
| 2017/0368953 A1* | 12/2017 | Zech | B60L 11/1818 |
| 2018/0001919 A1* | 1/2018 | Grou | B62B 3/04 |
| 2018/0370386 A1* | 12/2018 | Lery | B60M 7/003 |
| 2019/0084435 A1* | 3/2019 | Grace | B60L 58/12 |
| 2019/0263281 A1* | 8/2019 | Wang | B60L 53/24 |

* cited by examiner

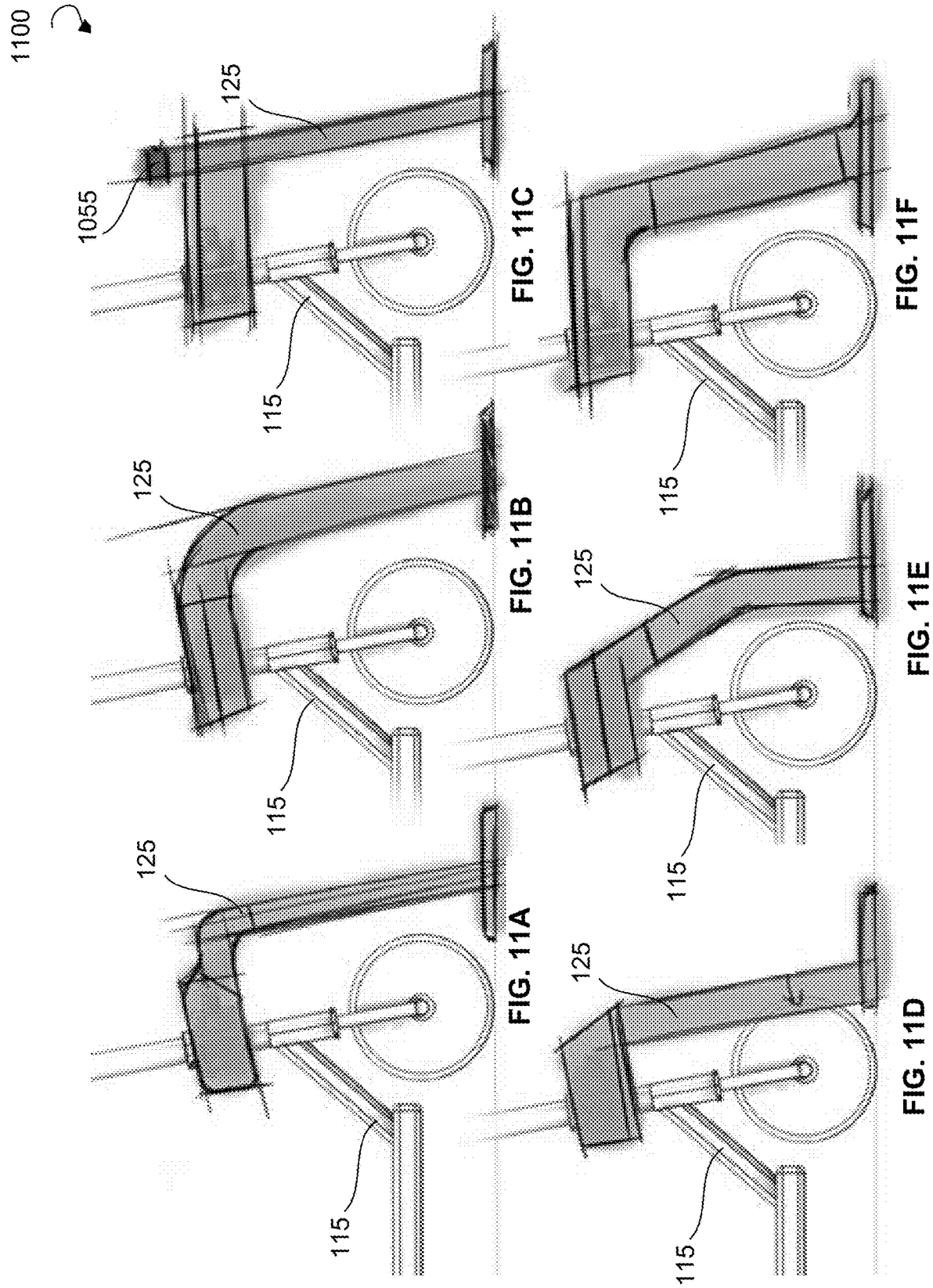

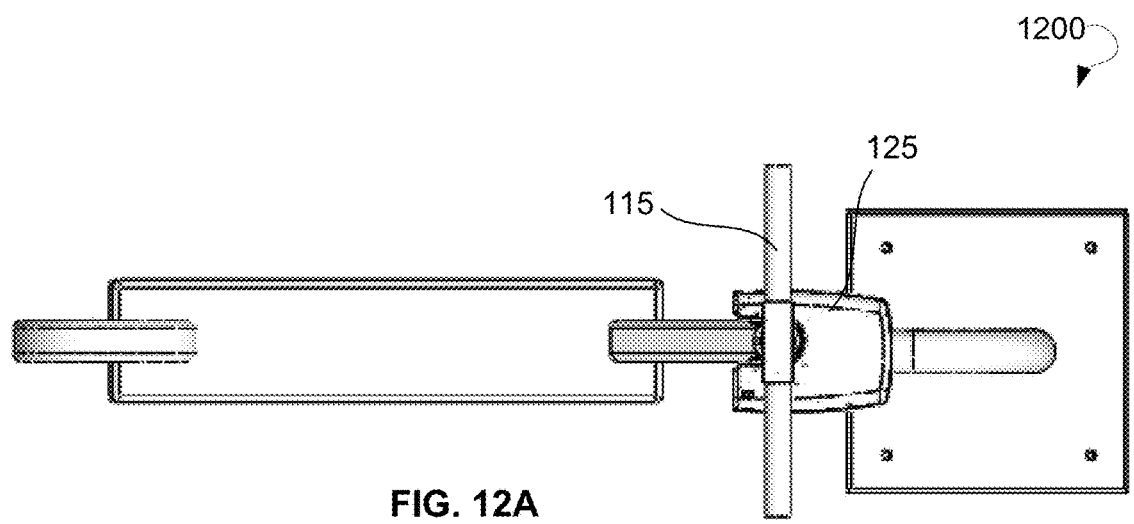
FIG. 12A
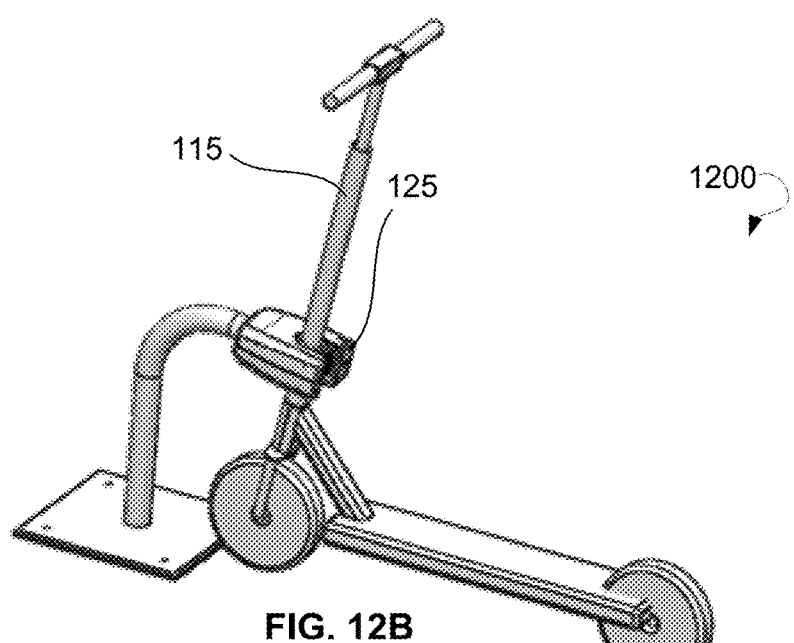
FIG. 12B
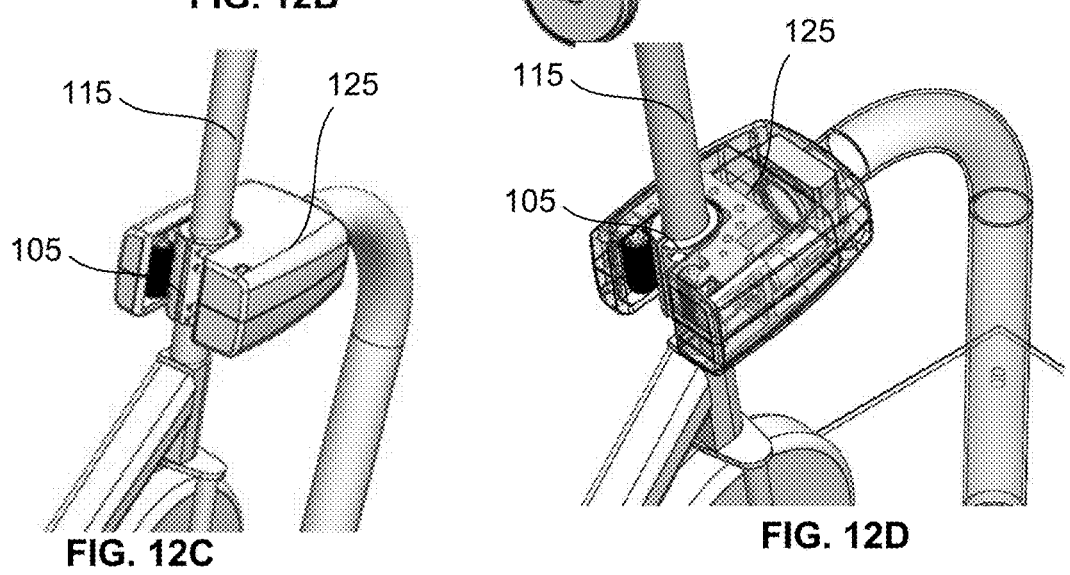
FIG. 12C
FIG. 12D

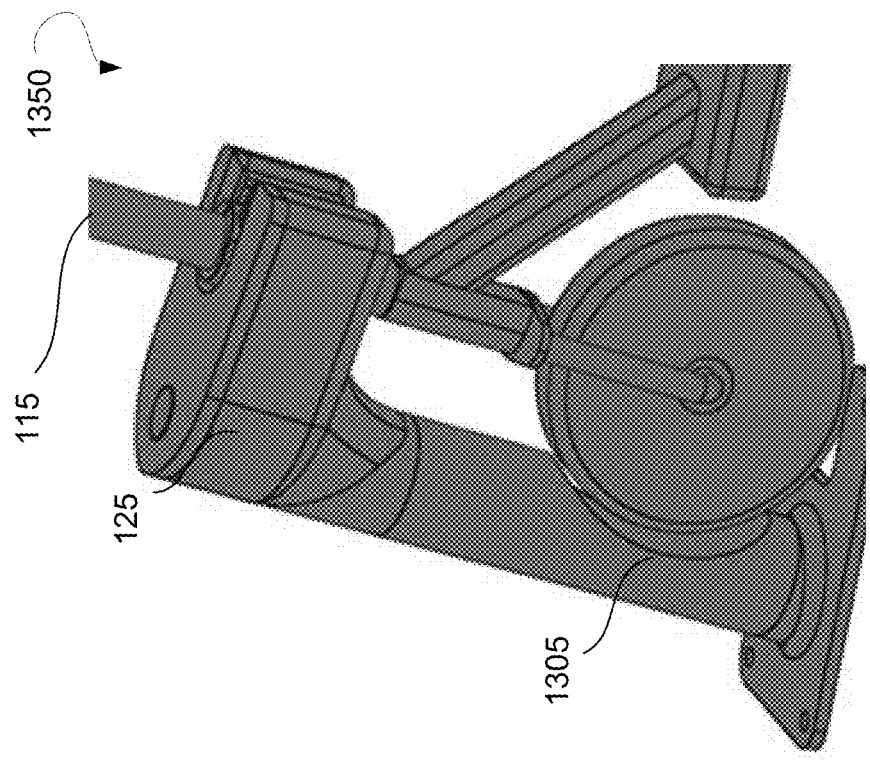
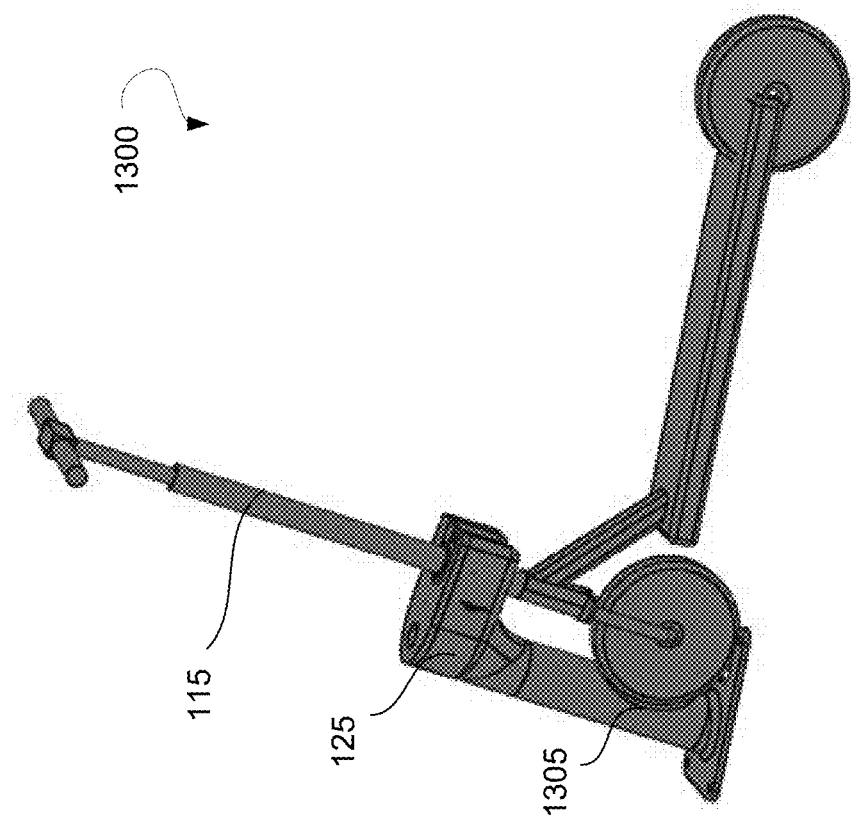
FIG. 13A
FIG. 13B

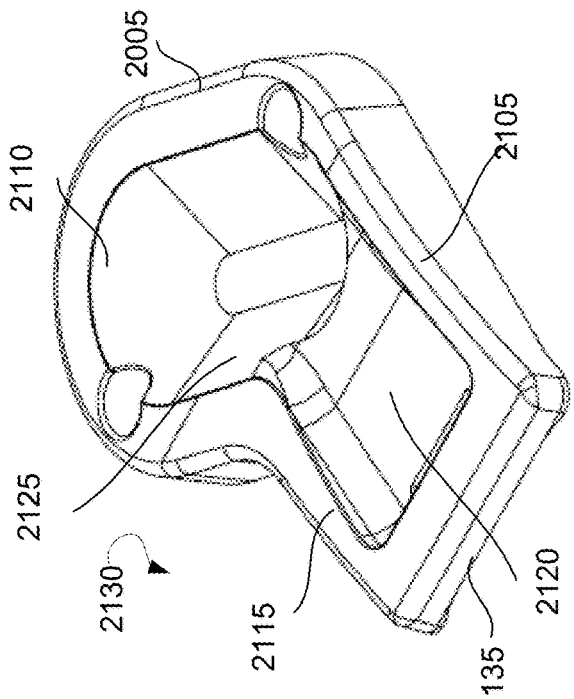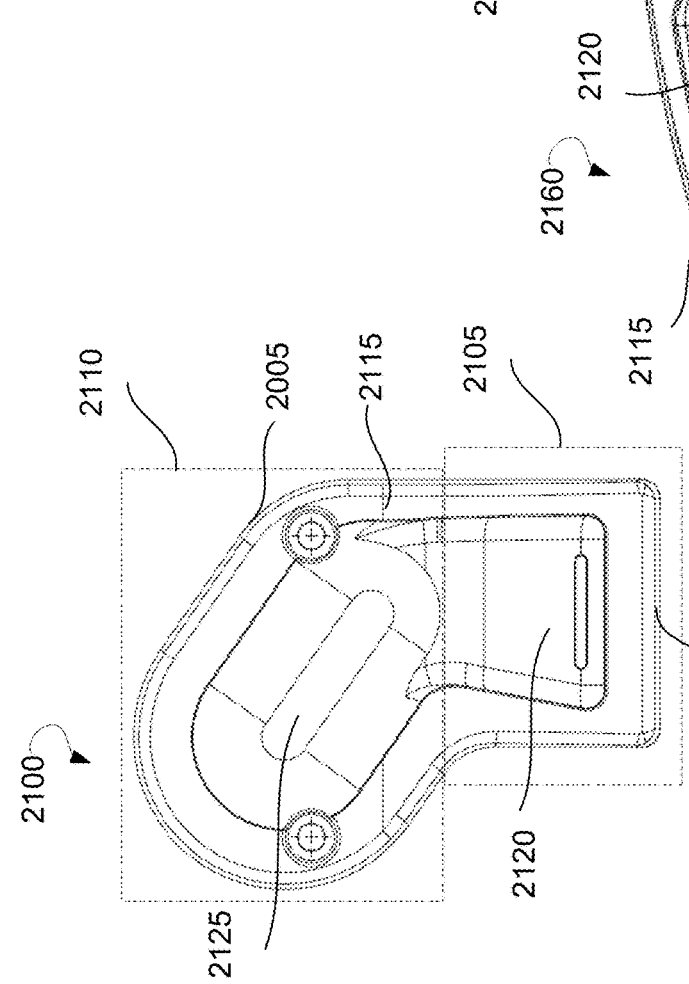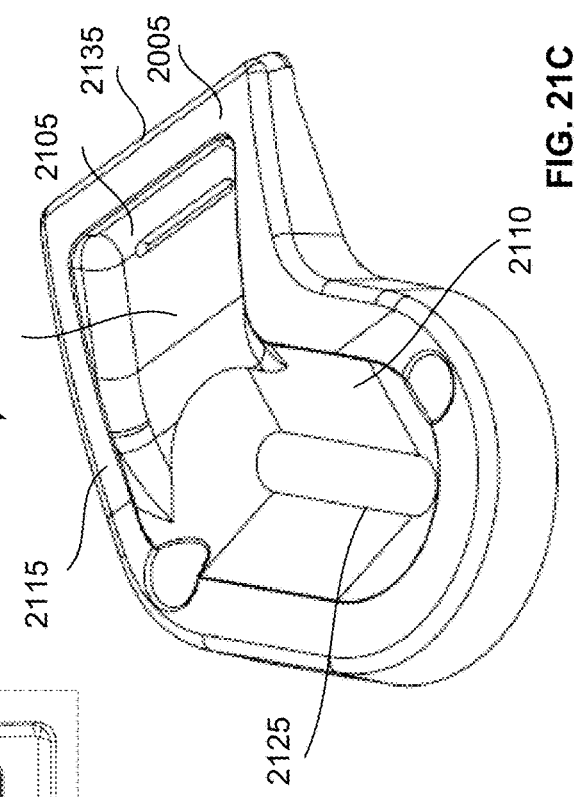

LIGHT ELECTRIC VEHICLE PARKING AND CHARGING STATIONS AND SMART CHARGING SYSTEMS FOR THE VEHICLE BATTERIES

CROSS-REFERENCES TO RELATED APPLICATIONS

This application claims the priority benefit of US Provisional Application Ser. No. 62/703,607, filed Jul. 26, 2018, and U.S. Provisional Application Ser. No. 62/828,313, filed Apr. 2, 2019. The disclosures of these applications are incorporated by reference herein in their entireties.

TECHNICAL FIELD

The present invention relates generally to light electric vehicles (LEVs) such as electric bicycles and electric scooters, and more particularly to charging systems and apparatuses for the LEVs.

BACKGROUND

LEVs such as electric bicycles and electric scooters have become a very popular mode of transportation, particularly when used as short term rentals. While the usefulness of LEVs vehicles is widespread, the vehicles are battery powered, and as such, require that their batteries remain charged to maintain the utility of the vehicle. Accordingly, systems, methods, and apparatuses to store LEVs and to recharge their batteries when the charge runs out are essential to maintaining the utility of the vehicles.

As a result of utilizing the teachings of the present disclosure, various LEV brands can be plugged into a single charging system, including both public and private LEVs. For example, private users may access charging systems built for public LEVs to recharge their personal LEVs.

Existing methods for fleet charging LEVs are expensive, unreliable, generate traffic, provide little ability for Quality Control, and regularly take vehicles completely out of service for indeterminate periods of time. For example, in-field battery swaps require the user or fleet operator to have an extra battery. Many LEVs have the battery built into the frame and as such they are not made to be removed and replaced. Batteries in LEVs that are designed to be removable can be exchanged for fully charged batteries, but this requires the user to carry a large and heavy battery to various and perhaps widespread locations, or for a fleet operator to locate a discharged vehicle, travel to the location and change the battery pack. These are costly and inconvenient procedures.

Individual owners and riders of LEVs carrying alternating current (AC)/direct current (DC) chargers need access to a power supply, typically an AC outlet, to plug in their chargers away from home, which greatly limits the available options. In many instances, wall outlets are simply not accessible at or near outdoor LEV parking spaces. Quite often, LEVs are not allowed or are considered inappropriate for indoor environments for charging. Fleet operators also have a difficult time with having users carry AC/DC chargers because this approach would require a charger to be issued to everyone renting a vehicle.

Replacing LEVs in the field also presents a significant logistics challenge and is unreliable and unpredictable. Thus, the existing methods of charging depleted LEV batteries are labor intensive, expensive, and put the burden of planning for recharging on the LEV user or the LEV fleet operator.

Charge hubs that are connected to city power supplies and are configured to service only one make/brand of LEV manufacturer are costly and inefficient. Such limited charging solutions are not feasible for general use due to the diverse types of LEVs available in the marketplace. Because such charge hub methods are brand-specific, scalability for multi-brand charging becomes impossible. In addition, the ability of charge hubs to be used by private individuals who desire to use their own LEVs in the public domain for quick-charge applications for mobility in lieu of automobile or ride-hailing services is severely limited. Moreover, the need to be in communication with the subject city's electric grid drastically limits the geographic locations where such charging stations can be placed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one approach of the present disclosure, a universal charging system is provided. The universal charging system may include a charging adapter configured to be mounted on a LEV, a charging station, and a processor configured to control charging of the LEV. The charging adapter may have electrical contacts for docking with a charging station and a charging interface for supplying power from the charging station to a battery of the LEV. The charging station may have at least one docking unit for receiving the charging adapter of the LEV. The at least one docking unit may have further electrical contacts for connecting to the charging adapter of the LEV.

According to another approach of the present disclosure, a LEV docking station is provided. The LEV docking station may have a plurality of docking bays. Each of the plurality of docking bays may include a docking unit and a wheel block. The docking unit may include at least a docking member configured to reversibly receive a LEV. The wheel block may be configured to align the LEV in the docking unit and limit a movement of the LEV after the LEV is docked with the docking unit.

According to another approach of the present disclosure, a system for controlling charging of one or more LEVs at a LEV docking station is provided. The system may include a processor in communication with one or more docking units of the LEV docking station and a memory unit in communication with the processor and configured to store instructions executable by the processor. The processor may be configured to determine a presence of a LEV connected to one of the one or more docking units and identify parameters associated with the LEV. The processor may be configured to determine a charge voltage of the LEV based on the parameters. The processor may be further configured to develop a charging profile for the LEV based on the charge voltage and the parameters. The processor may be further configured to instruct the one of the one or more docking units to supply power to the LEV based on the charging profile.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

The features of the invention are set forth with particularity in the appended claims. A better understanding of the features and advantages of the present invention will be obtained by reference to the following detailed description that sets forth illustrative embodiments, in which the principles of the invention are utilized, and which the accompanying drawings illustrate.

FIGS. 11A-11F are schematic diagrams of a LEV docked with a docking unit, according to an example embodiment.

FIG. 12A is a top view of a LEV docked with a docking unit, according to an example embodiment.

FIG. 12B is a general perspective view of a LEV docked with a docking unit, according to an example embodiment.

FIGS. 12C and 12D are enlarged views of a charging adapter of a LEV engaged with a docking unit, according to an example embodiment.

FIG. 13A is a general perspective view of a LEV docked with a docking unit, according to an example embodiment.

FIG. 13B is an enlarged view of the docking unit having a cutout, according to an example embodiment.

FIG. 21A shows an upper view of a wheel block, according to an example embodiment.

FIG. 21B shows a front perspective view of a wheel block.

FIG. 21C shows a rear perspective view of a wheel block.

DETAILED DESCRIPTION

Figures 1A, 1B:
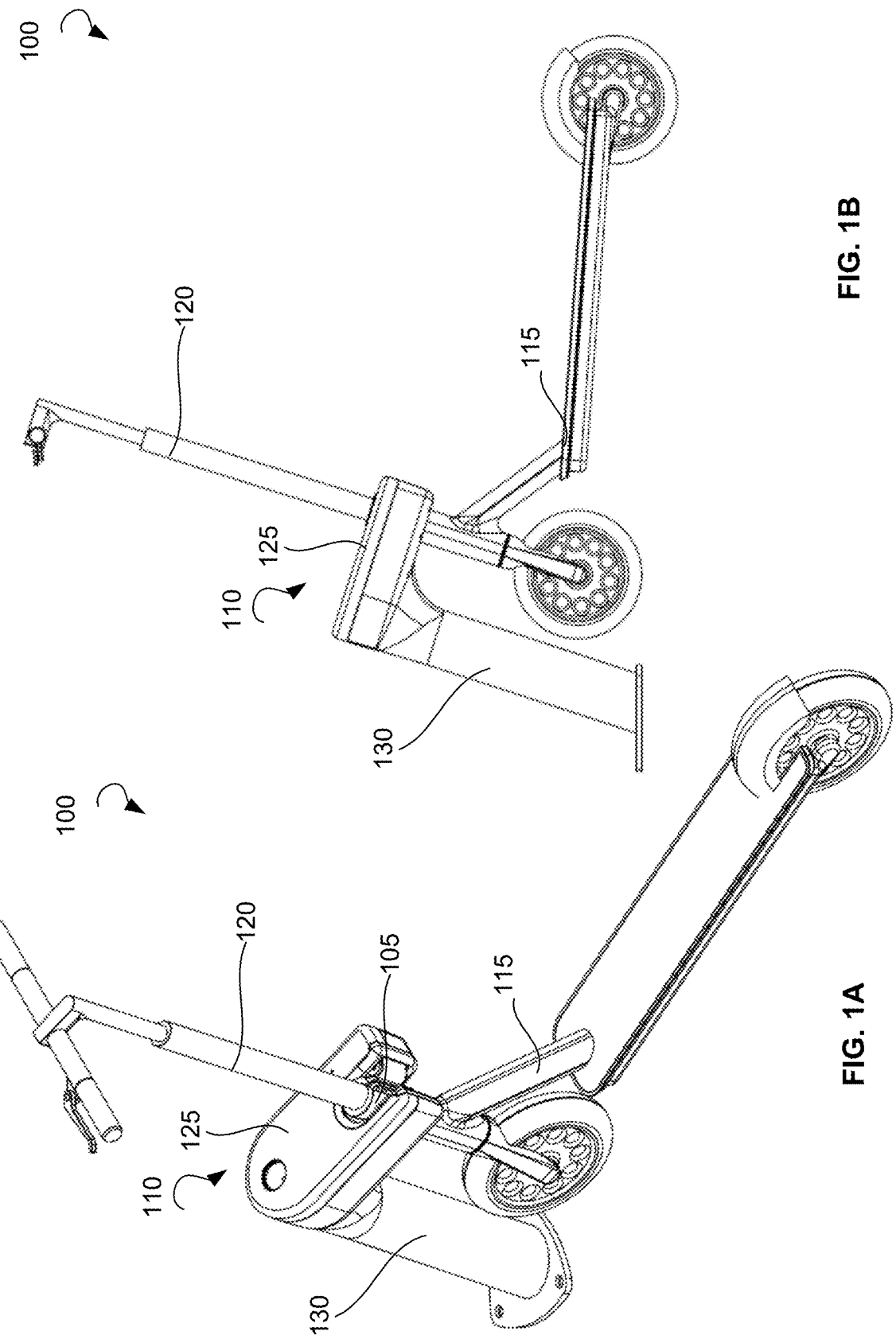
FIG. 1A is an overall perspective view of a universal charging system, according to an example embodiment.
FIG. 1B is a side view of a universal charging system, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure provides systems, devices, and methods for charging and/or docking LEVs. The systems, devices, and methods of the present disclosure allow individuals and fleet operators to use the LEVs in both high density urban environments and suburban mixed-use communities. In certain aspects, the present disclosure provides for a universal charging system that includes a charging adapter configured to be mounted on LEVs and a charging station deployed in public and private locations. The charging adapter may include a universal charge adaptor configured to be retrofit onto existing LEVs to enable charging by various charging stations. Such charging stations may be geographically positioned as part of one or more different charging networks to allow convenient and on-the-go charging. The universal charging system with charging stations can be configured to provide alternative and/or hybrid power solutions that may incorporate multiple energy sources (e.g., connected to an electric grid of a city, or solar power with or without on-site battery storage). This approach is superior to conventional methods for repowering LEVs, which may require in-field battery swaps, carrying a manufacturer-supplied AC/DC charger, having AC wall power access, or using public charging hubs that run off of city power and are dedicated to charging one make/brand of a LEV manufacturer. Other conventional systems require using designated workers that locate, retrieve, charge, and replace LEVs in the field regularly.

In an example embodiment, the charging adapter may include a charging interface suitable for adapting a diverse array of LEVs to use the universal charging system. By standardizing the charging interface, all LEVs can be adapted to use the universal charging system. In some embodiments, the charging station may be deployed in public and private locations to provide charging access everywhere. In some embodiments, in locations lacking a built-in power supply, the charging station may be powered using solar or wind as a completely off-grid unattended charging station. In some embodiments, the charging station may be connected to a communication network, such as a cellular network, and may optionally report a charge status and/or vehicle ID for each LEV being charged by reading a unique ID chip located in each charging adapter. The ID chip may store a unique identifier, which can be read by a processor of the charging station, stored in a backend database, and further used for cross-referencing information related to the LEVs based on the unique identifiers. In some embodiments, a power source of the charging station is regulated and compliant, and commonality with connectors of the charging adapter may insure that the LEVs have proper electrical treatment during charging. Moreover, in some embodiments, the charging station may be equipped with a locking mechanism that may be activated upon request by a vehicle owner to sequester a LEV during the recharging cycle to insure a complete recharge when the LEV is docked, thus reducing or eliminating partial charging.

One advantage of the present disclosure is that it provides a universal charging system that can generate power using alternative energy sources instead of relying on conventional city owned or other power sources. In some embodiments, the universal charging system has the ability to run with an uninterruptible power system (UPS) and/or battery storage power in the event alternative energy is insufficient. At scale, the innovation of adapting an alternative energy source to power LEVs may have a tremendous advantage to the power grid requirements that may be increasingly taxed as electric vehicles scale over fossil fuel powered vehicles in the broader market.

Another advantage of the present disclosure is that it enables all types of LEVs to charge using a single type of charging station by retrofitting a charging adapter to existing vehicles. Conventional charging methods use manufacturer-provided power supplies that are proprietary and that require a user to plug into an AC wall outlet. In contrast, LEVs with a charging adapter according to the present disclosure can dock and charge in universal LEV charging stations everywhere. Users and fleet operators may no longer need to carry extra hardware to ensure LEVs remain charged. LEVs may not need to be brought inside to charge by a wall outlet. In-field battery swaps may become unnecessary, as do locating and retrieving the LEVs themselves. Users may dock LEVs in charging stations and the LEVs may always be charged for use. The charging stations can also include various features, such as automatic and/or user selectable locking mechanisms for securing the LEV during charging.

Still another advantage of the present disclosure is that charging adapters and/or docking units may allow operators to comply with local regulations regarding such docking solutions. Accordingly, in contrast to the conventional charging solutions, the present disclosure provides charging solutions that are well suited to both private users of LEVs and fleet operators. For example, deploying a vehicle retrofitted with a universal charging adapter and charging stations may allow for the provisioning of a charging ecosystem that is adaptable to a wide variety of LEVs while facilitating consistency and uniformity of the charging equipment and parameters.

Referring now to the drawings, FIG. 1A is an overall perspective view of a universal charging system 100, according to an example embodiment. FIG. 1B is a side view of a universal charging system 100, according to an example embodiment. The universal charging system 100 may include a charging adapter 105 and a charging station 110. The charging adapter 105 may be configured to be mounted on a LEV 115. In an example embodiment, the charging adapter 105 may be mounted on a headtube 120 of the LEV 115. The charging station 110 may include a docking unit 125 for receiving the charging adapter 105 of the LEV 115. The charging station 110 may further include a support 130 on which the docking unit 125 is disposed. The support 130 can be vertical or inclined. In an example embodiment, an angle of inclination of the support 130 can be similar to an angle of inclination of the headtube 120 of the LEV 115. LEVs produced by various manufactures typically have approximately the same angle of inclination of the headtube, which is selected by the manufactures so as to ensure a comfortable position for a user when riding the LEV. The LEV 115 may include a vehicle, such as an electric bicycle or an electric scooter. In some embodiments, charging stations 110 may be geographically positioned at public and private locations, allowing users to return and/or charge the LEVs 115 in easily accessible public or private charging locations without requiring further assistance or extra equipment.

Figures 2A, 2B:
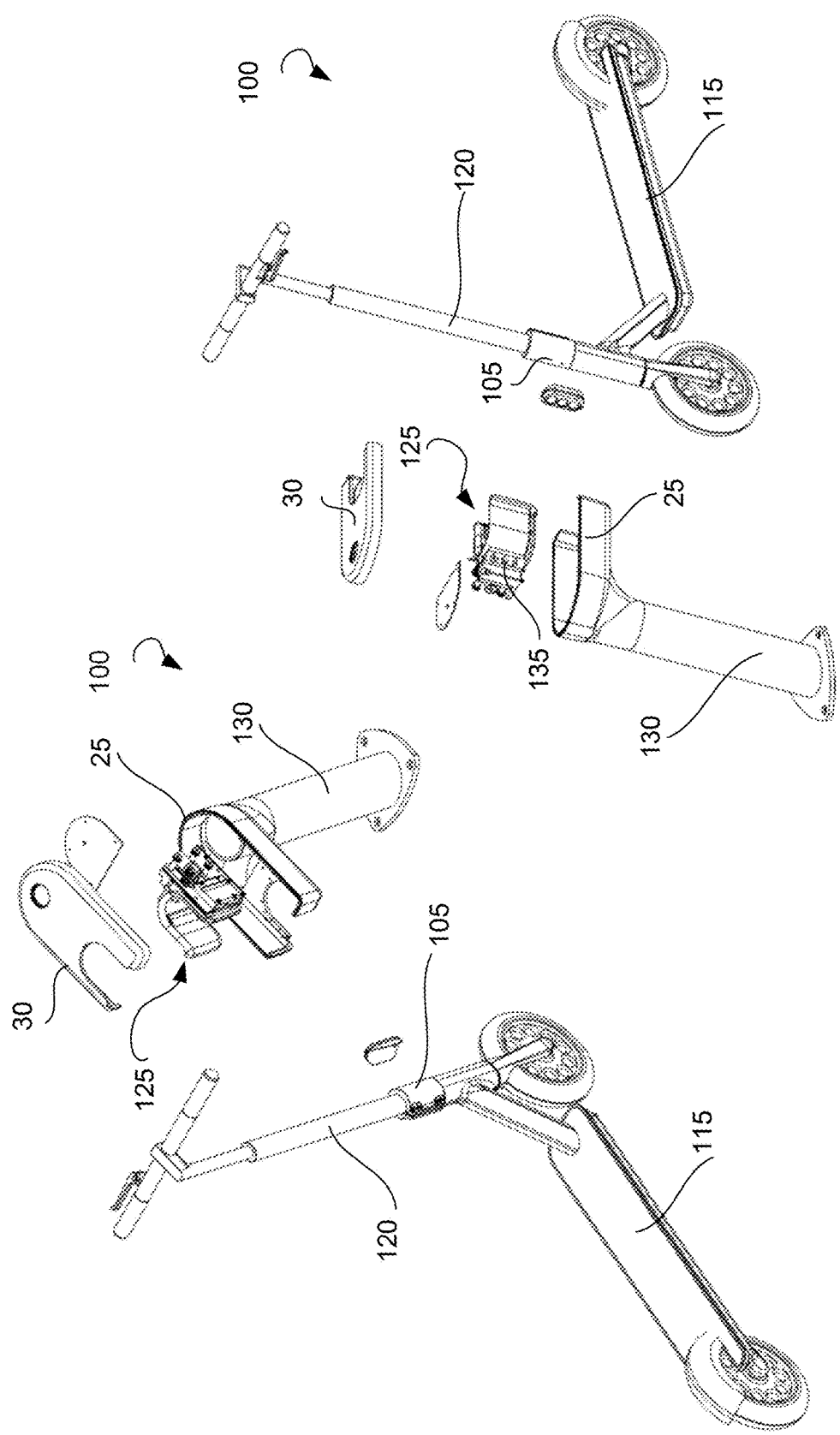
FIG. 2A is a rear perspective expanded view of a universal charging system, according to an example embodiment.
FIG. 2B is a front perspective expanded view of a universal charging system, according to an example embodiment.

FIG. 2A is a rear perspective expanded view of a universal charging system 100, according to an example embodiment. FIG. 2B is a front perspective expanded view of a universal charging system 100, according to an example embodiment. The docking unit 125 may include a lock housing 25 and a cover 30. The docking unit 125 is shown in detail in FIG. 3.

Figure 3:
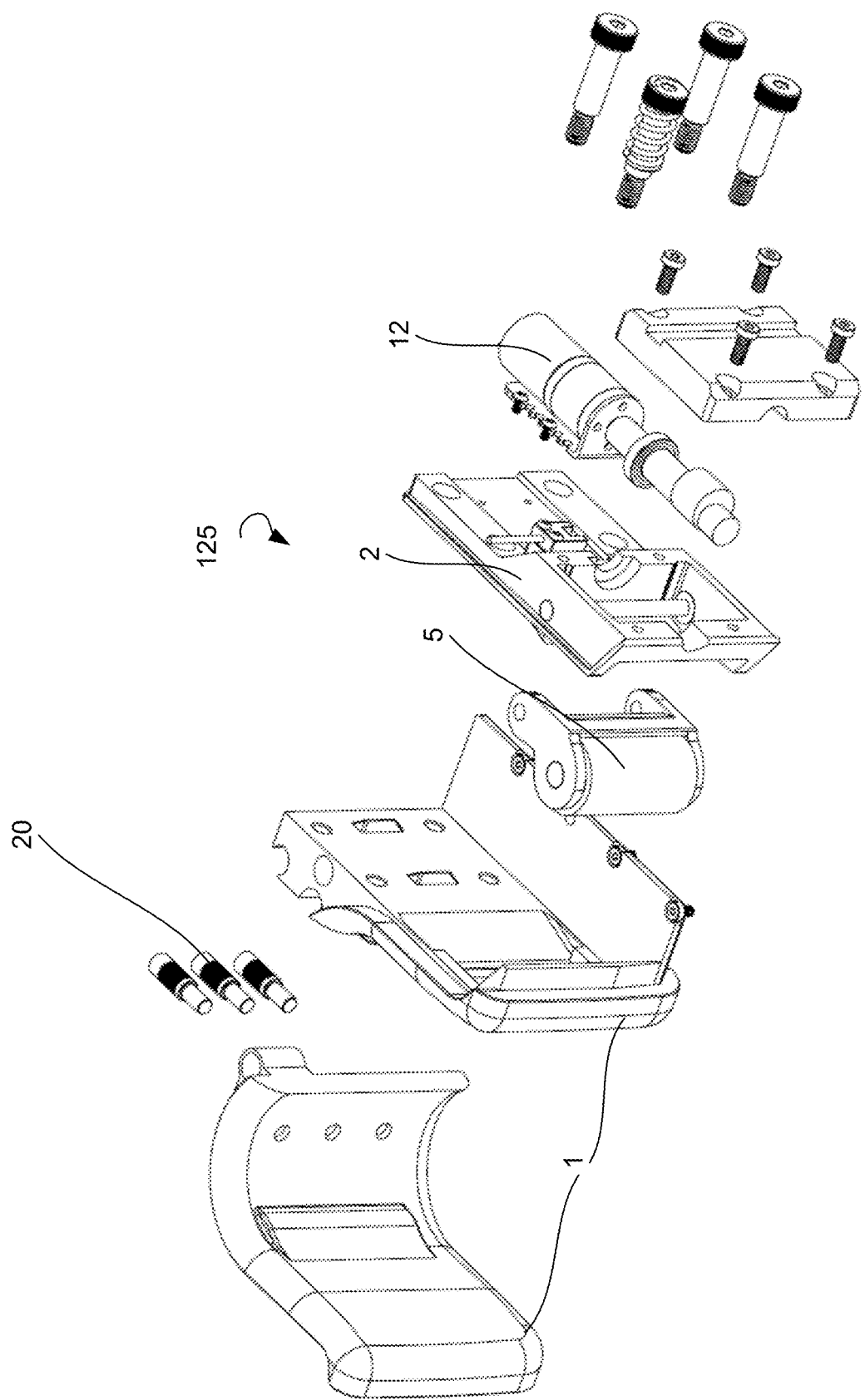
FIG. 3 is an expanded view of a docking unit, according to an example embodiment.

FIG. 3 is an expanded view of a docking unit 125, according to an example embodiment. The charging station may include at least one docking unit 125 for receiving a charging adapter of a LEV. The docking unit may include further electrical contacts for connecting to the charging adapter 105 of the LEV 115. In FIG. 3, the further electrical contacts are shown as contact pins 20. The docking unit 125 may further include a contact block 1 and a locking mechanism represented by a locking arm 2, a tension arm 5, and a lock actuator 12. The locking mechanism can be configured to lock the LEV into the docking unit 125.

Figure 4:
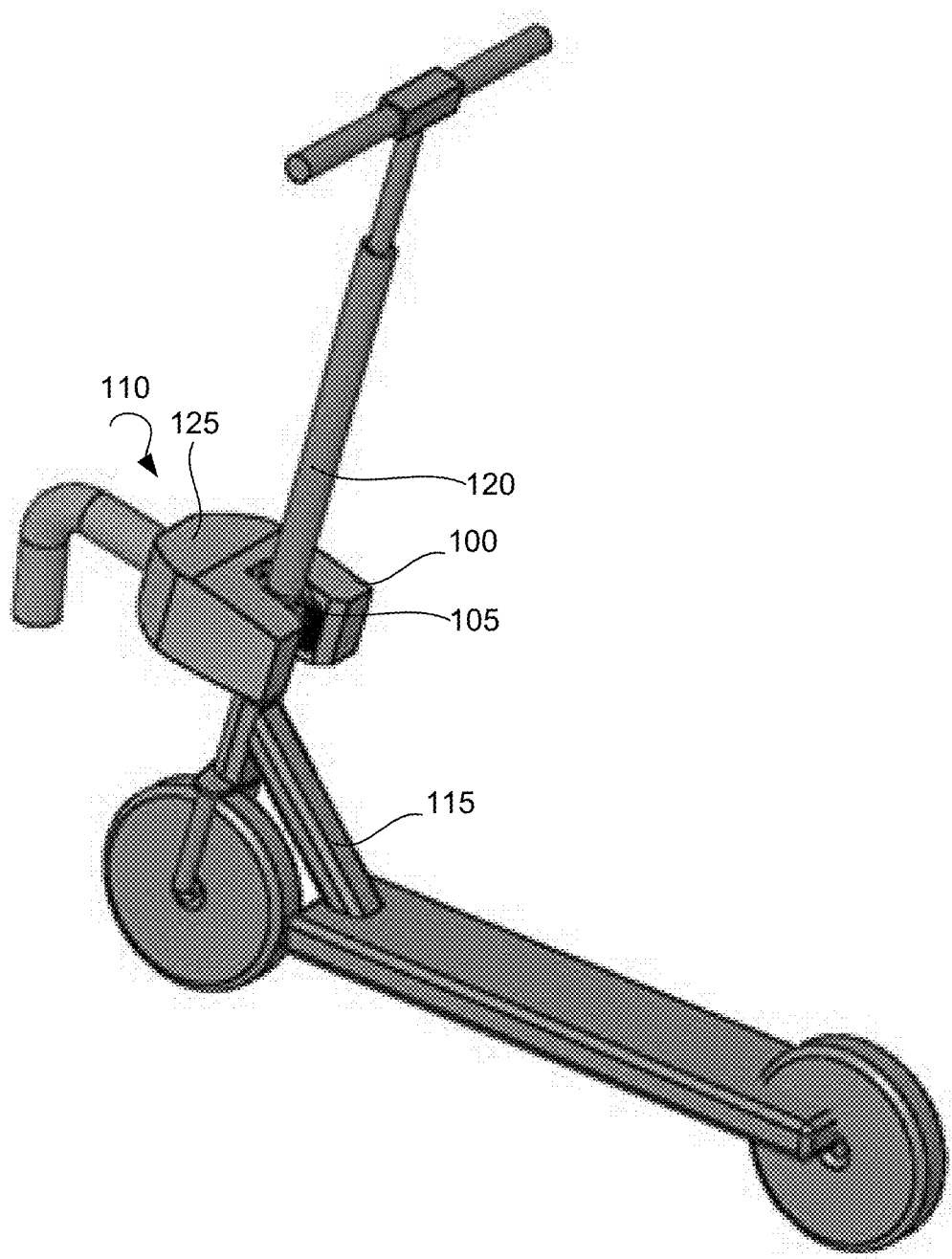
FIG. 4 is a schematic diagram illustrating a universal charging system, according to another example embodiment.

FIG. 4 is an overall perspective view 400 of another example embodiment of a universal charging system 100, according to an example embodiment. The universal charging system 100 may include a charging adapter 105 and a charging station 110. The charging adapter 105 may be configured to be mounted on a LEV 115. In an example embodiment, the charging adapter 105 may be mounted on a headtube 120 of the LEV 115. The charging station 110 may include a docking unit 125 for receiving the charging adapter 105 of the LEV 115.

Figure 5:
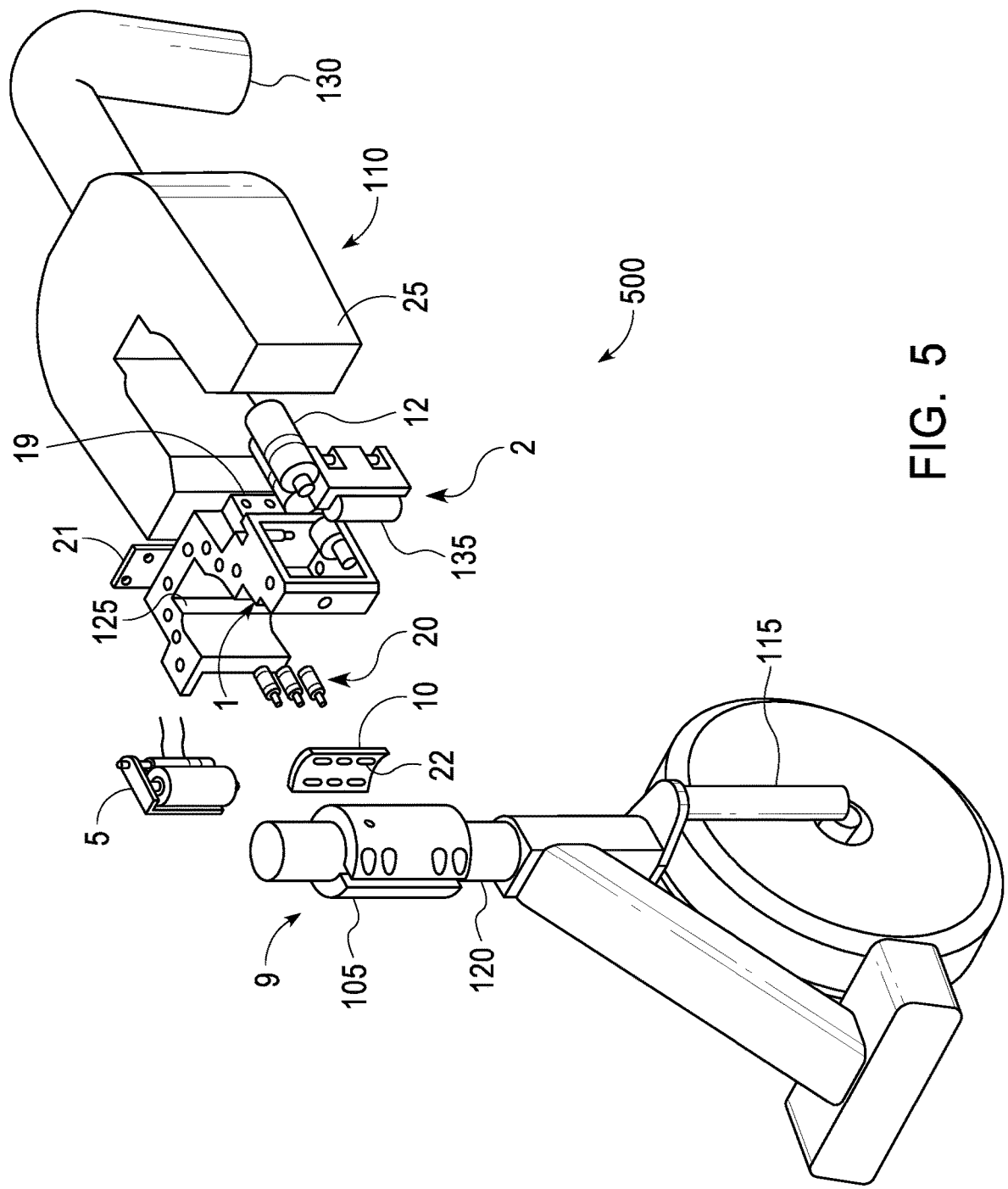
FIG. 5 is an expanded view of a universal charging system, according to an example embodiment.

FIG. 5 is an expanded view 500 of a universal charging system shown in FIG. 4. The charging adapter 105 can be configured to couple directly to a LEV of any manufacturer without requiring an alteration of an existing charge connector of the LEV. Specifically, the charging adapter 105 may include a cable for wiring with the existing charge connector or a charging port of the LEV 115.

Once the charging adapter 105 is installed on the LEV 115, the LEV 115 can dock directly into the docking unit 125 of the charging station 110 without the need for plugging in cables or locating a wall outlet.

The charging adapter 105 may include electrical contacts 22 for docking with the charging station 110 and a charging interface (shown as charging interface 135 in FIG. 2B) for supplying power from the charging station 110 to a battery (not shown) of the LEV 115. The charging adapter 105 may further include a collar 9 configured to enclose the headtube 120 of the LEV 115. The charging adapter 105 may further include a charging adapter plate 10 attached to the collar 9. The electrical contacts 22 may be placed on the charging adapter plate 10. The charging adapter 105 may further include a housing and an adhesive backing.

The charging adapter 105 may be injection molded or machined and electrical contacts may be assembled into a housing of the charging adapter 105. All electrical contacts may be wired into an integrated circuit. Once all components of the charging adapter 105 are assembled, an industrial-strength, non-removable adhesive may be applied to seal all components and wires inside the housing of the charging adapter 105.

Figure 6:
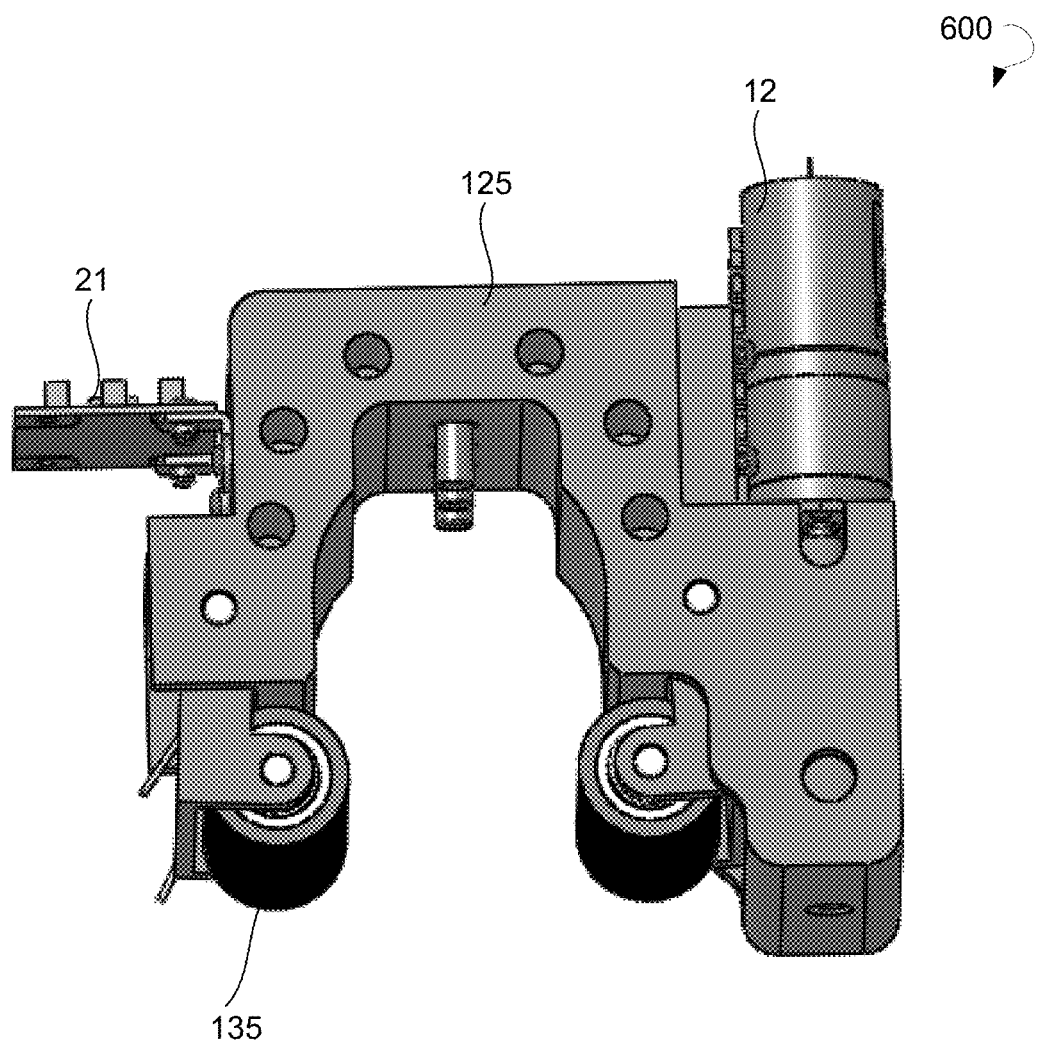
FIG. 6 is a top-down close-up view of a docking unit of a charging station, according to an example embodiment.

The charging station 110 may include at least one docking unit 125 for receiving the charging adapter 105 of the LEV 115. FIG. 6 shows a top-down close-up view 300 of the docking unit 125 of the charging station. The docking unit 125 may include further electrical contacts for connecting to the charging adapter 105 of the LEV 115. In FIG. 5, the further electrical contacts are shown as contact pins 20. The docking unit 125 may further include a contact block 1 and a locking mechanism represented by a locking arm 2, a tension arm 5, a lock actuator 12, an actuator mounting bracket 19, a plate 21, and a lock housing 25. The locking mechanism can be configured to lock the LEV into the docking unit 125. The docking unit 125 may further include indicator lights (e.g., red, green, yellow) and a mount 130. The contact pins 20 may be disposed in the contact block 1. The locking arm 2 and the tension arm 5 may include spring roller grippers 135 configured to grip the charging adapter 105 of the LEV 115. The locking mechanism may be made by machining all components, assembling the components, and installing torsion springs for tensioning the roller grippers and spring pin contacts for making electrical connection to the charging adapter.

The docking station 110 may further include a processor (not shown) configured to control charging of the LEV 115 and a battery storage (not shown) for storing power to be supplied to the LEV 115. In an example embodiment, the docking station 110 may further optionally include one or more of a power inverter, a cellular radio, and a GPS locator.

The charging adapter 105 of the LEV 115 may further include an ID chip associated with the LEV. The ID chip may store an identifier associated with the LEV. The processor of the docking station 110 may be configured to store the identifier to a memory unit of the docking station 110.

In an example embodiment, the locking mechanism may be incorporated into the docking unit 125. When the locking mechanism is employed, the locking mechanism may enable the charging station to lock the LEV 115 during the recharge process which can last, for example, as long as 5 hours, depending on the LEV type and state of discharge. By locking the LEV 115 during the charging process, the universal charging system can insure that each time the LEV 115 is docked into the charging station, the LEV 115 is charged completely.

The charging station may optionally have an indicator configured to show a charge status of the LEV. The indicator, such as LEDs, may enhance the user experience by providing charge status feedback.

The charging station may have various options for power sources to supply the power to the LEVs. The charging station may obtain power from solar, wind, electrical grid, liquid or gas fuel generators, or other sources. Specifically, the docking unit 125 may be configured to connect to one or more power sources. The power sources may include an electric grid, a solar power source, a self-generating power source, a battery storage, and so forth.

In an example embodiment, the charging station 110 may further include a backend platform in communication with the processor. The backend platform may include an administrative panel, a customer portal, and a user portal. The backend platform may include a charge management platform having advanced reservation and scheduling capabilities as well as advanced charge management capabilities. Connectivity and charge status monitoring of individual LEVs or fleet charging LEVs may be accessed by users of LEVs or operators of the backend platform through mobile applications running on user devices.

Figure 7A:
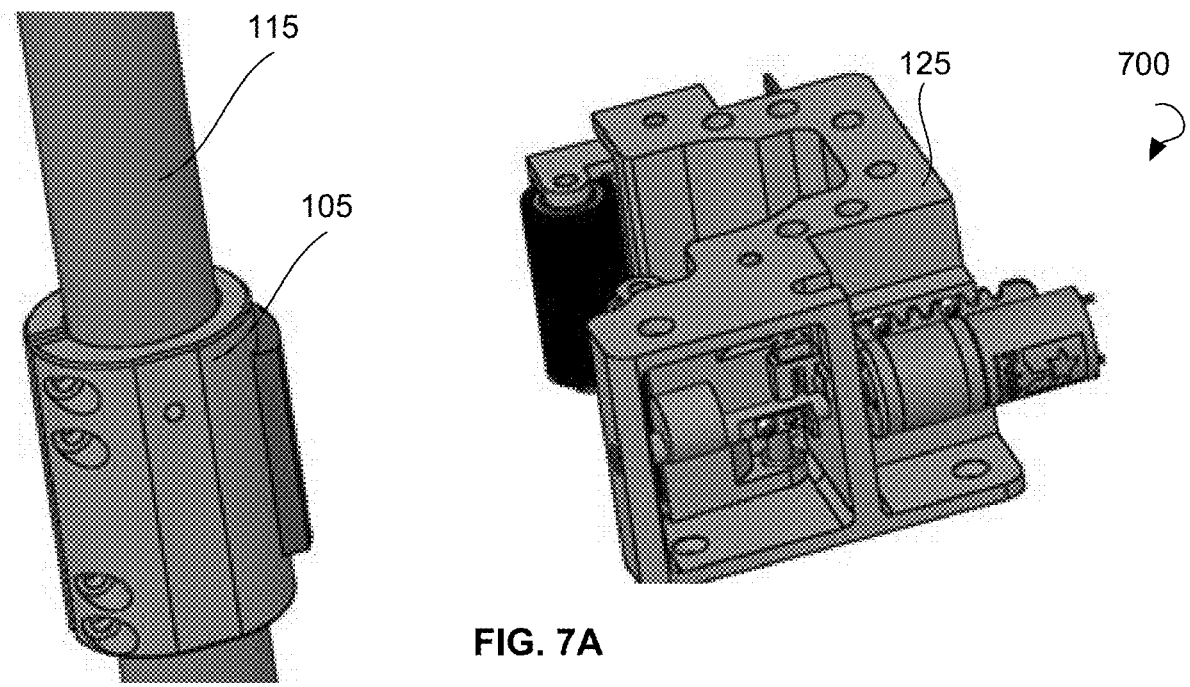
FIG. 7A is a close-up view of a charging adapter separate from a docking unit, according to an example embodiment.
Figure 7B:
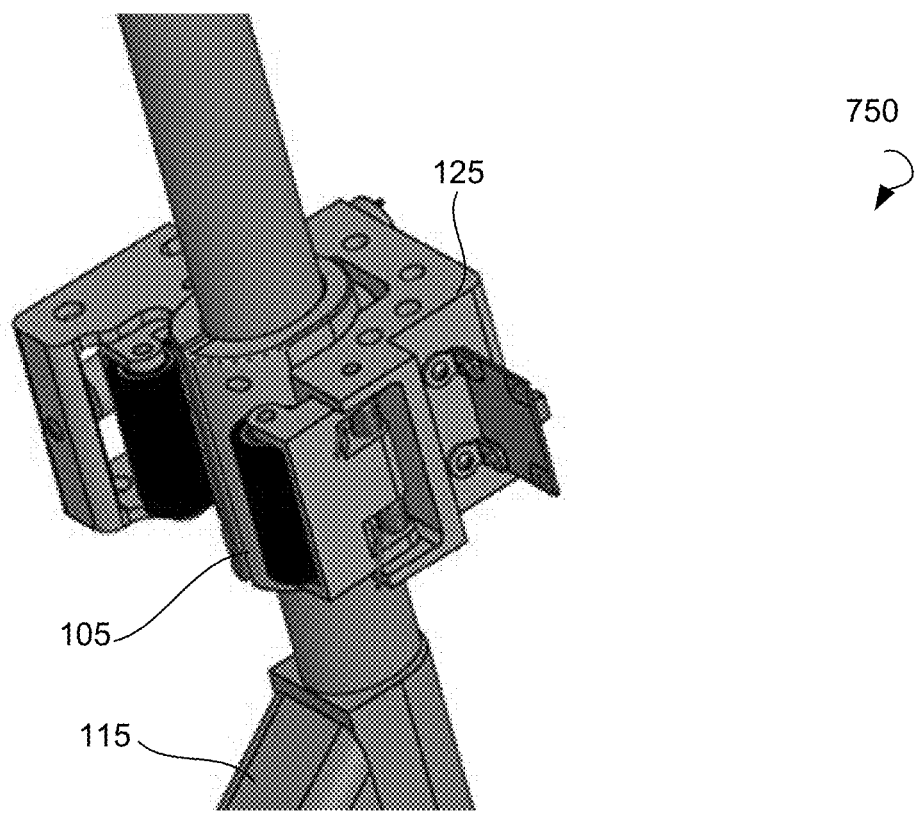
FIG. 7B is a close-up view of a charging adapter docked with a docking unit, according to an example embodiment.

FIG. 7A shows a close-up view 700 of a charging adapter 105 separate from a docking unit 125. FIG. 7B shows a close-up view 750 of a charging adapter 105 docked with a docking unit 125. The charging adapter 105 may be firmly secured to a pre-determined location on a LEV 115. The cable (not shown) of the charging adapter 105 may be wired to a charging port of the LEV 115. A user may determine the location of the charging station using a mobile application. At the location of the charge station, the user may push the LEV 115 into the docking unit 125 and charging can start immediately. The user may return later, remove the LEV 115, and start riding LEV 115.

Figure 8A:
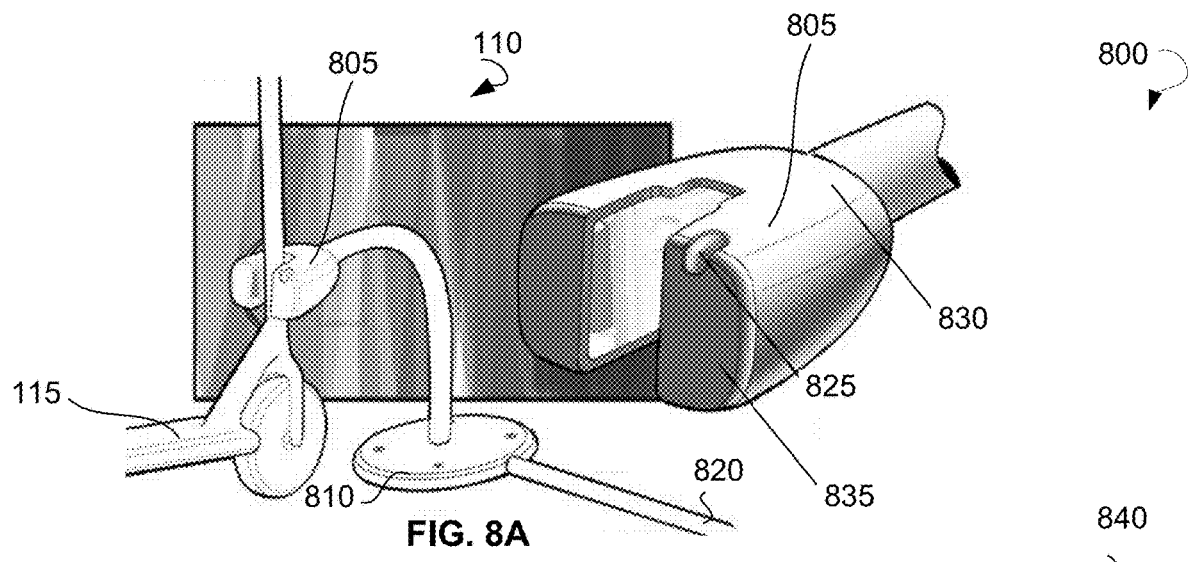
FIG. 8A is an illustration of a LEV docked with a docking unit of a charging station, according to an example embodiment.

FIG. 8A is an illustration 800 of a LEV 115 docked with a docking unit 805 of a charging station 110, according to an example embodiment. The charging station 110 may further include a base plate 810 and a conduit 815 for power supply. The docking unit 805 may further include an indicator 825. The indicator 825 may be located at the intersection of an upper surface 830 and a front surface 835 of the docking unit 805. The indicator 825 may include a bi-color LED that illuminates during charging. The red color may indicate that charging is in progress and the green color may indicate that charging is completed. When the universal charging system detects that charging is complete, the "charging" LED indicator light turns off and the "ready to use" indicator light is illuminated. If an error or failure of any sort is detected, a third indicator LED is illuminated. When the "ready to use" indicator is illuminated, any credentialed user may be able to remove the LEV 115 from the docking unit 805 by pulling the LEV 115 out.

Figure 8B:
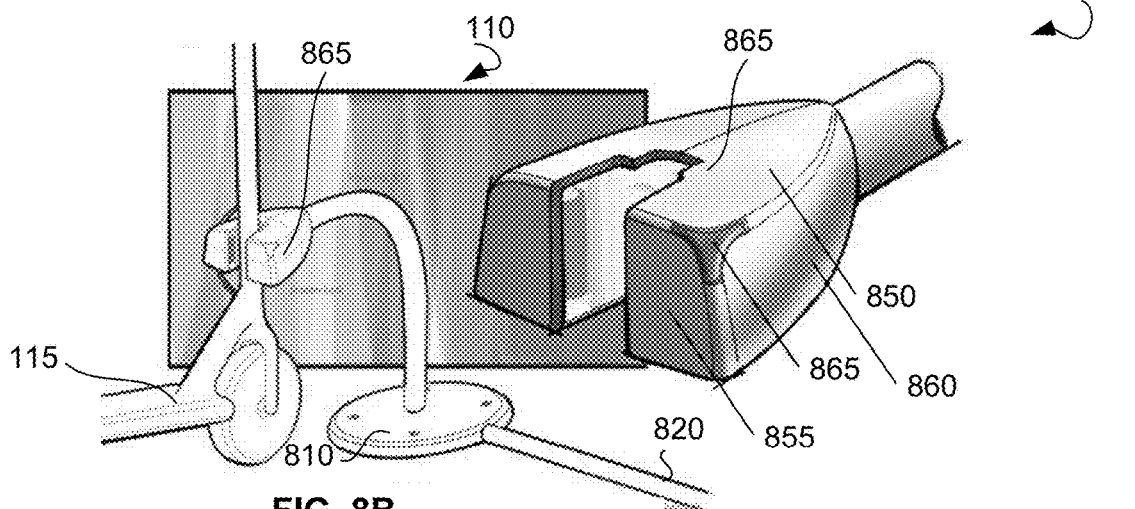
FIG. 8B is an illustration of a LEV docked with a docking unit of a charging station, according to an example embodiment.

FIG. 8B shows an illustration 840 of a LEV 115 docked with a docking unit 845 of a charging station 110, according to an example embodiment. The docking unit 845 may have an indicator 865. The indicator 865 may be located at the intersection of an upper surface 850, a front surface 855, and a side surface 860 of the docking unit 865.

Figure 8C:
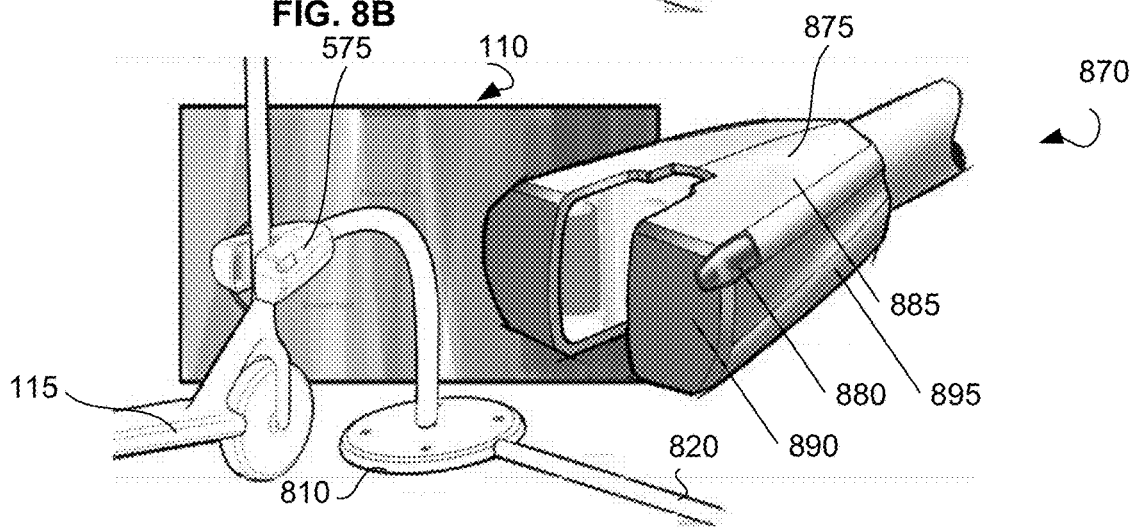
FIG. 8C is an illustration of a LEV docked with a docking unit of a charging station, according to an example embodiment.

FIG. 8C is an illustration 870 of a LEV 115 docked with a docking unit 875 of a charging station 110, according to an example embodiment. The docking unit 875 may have an indicator 880. The indicator 880 may be located at the intersection of an upper surface 885, a front surface 890, and a side surface 895 of the docking unit 875.

Figure 9:
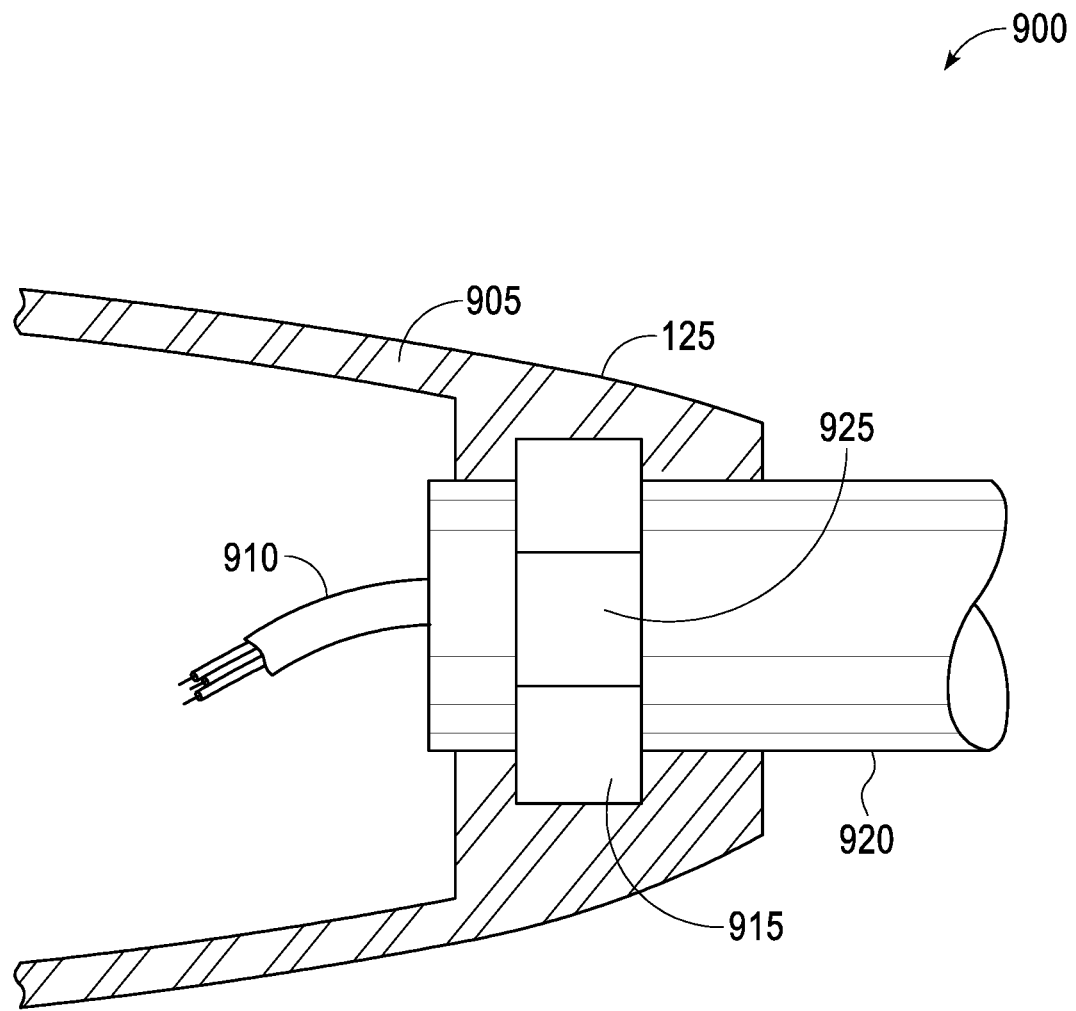
FIG. 9 is a section view of a docking unit, according to an example embodiment.

FIG. 9 shows a section view 900 of a docking unit, according to an example embodiment. The docking unit 125 may include a housing 905, a cable 910, a flange 915, a mounting arm 920, and a key element 925. The flange 915 maybe welded to the mounting arm 920. Two halves of the housing 905 may align and clamp over the flange 915 on the mounting arm 920. Two halves of the housing 905 may be bolted together.

Figures 10A, 10B:
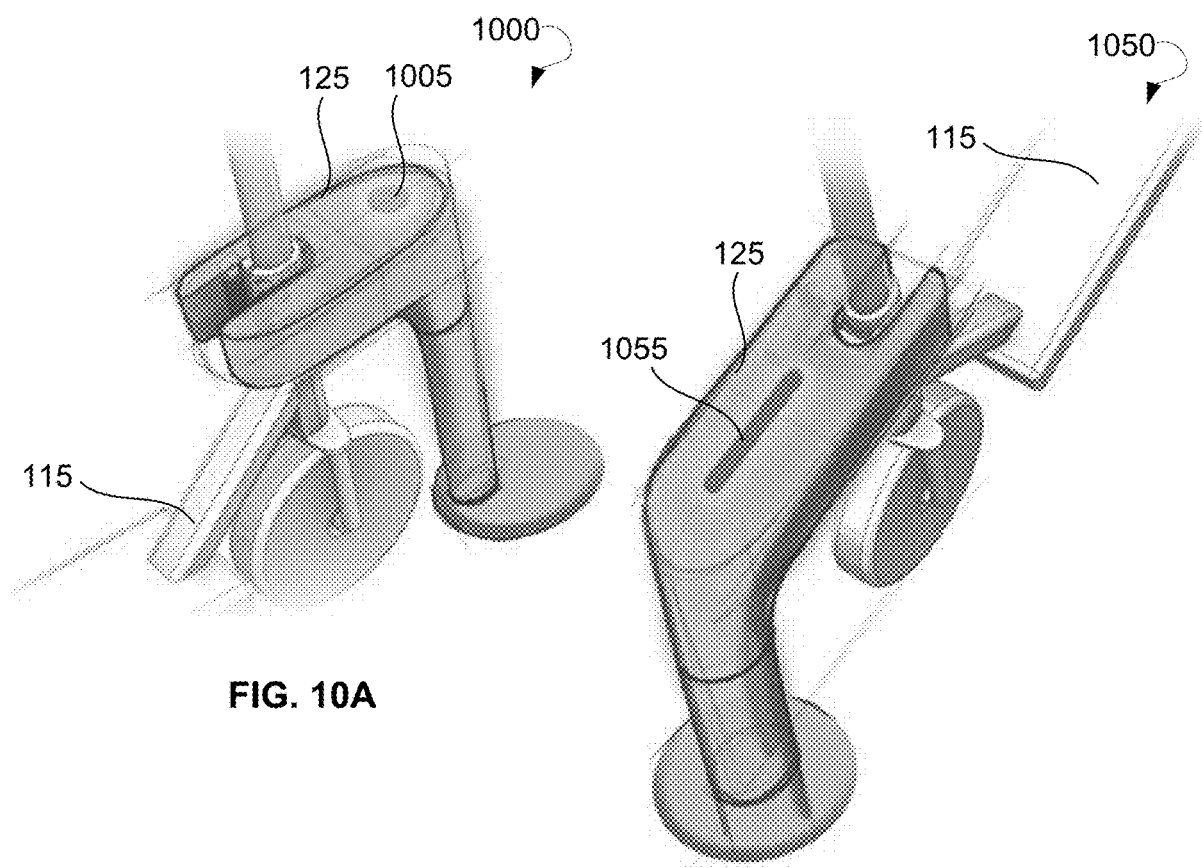
FIG. 10A is a schematic diagram of a LEV docked with a docking unit, according to an example embodiment.
FIG. 10B is a schematic diagram of a LEV docked with a docking unit, according to an example embodiment.

FIG. 10A is a schematic diagram 1000 of a LEV 115 docked with a docking unit 125, according to an example embodiment. An indicator 1005 on the docking unit 125 may illuminate green to indicate that the charging of the LEV 115 is complete. FIG. 10B is a schematic diagram 1050 of a LEV 115 docked with a docking unit 125, according to an example embodiment. An indicator 1055 on the docking unit 125 may illuminate red to show that the charging of the LEV 115 is in progress.

FIGS. 11A-11F are schematic diagrams of a LEV 115 docked with a docking unit 125. FIG. 12A is an upper view 1200 of a LEV 115 docked with a docking unit 125. FIG. 12B is a general perspective view 1250 of a LEV 115 docked with a docking unit 125. FIGS. 12C and 12D show enlarged views of a charging adapter 105 of a LEV 115 engaged with a docking unit 125.

FIG. 13A shows a general perspective view 1300 of a LEV 115 docked with a docking unit 125. The docking unit 125 may include a cutout 1305 to receive a front wheel of the LEV 105. FIG. 13B is an enlarged view 1350 of the docking unit 125 having a cutout 1305.

Figure 14A:
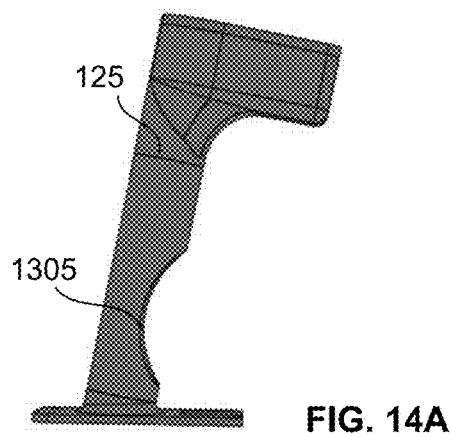
FIG. 14A is a side view of a docking unit with a cutout, according to an example embodiment.
Figure 14B:
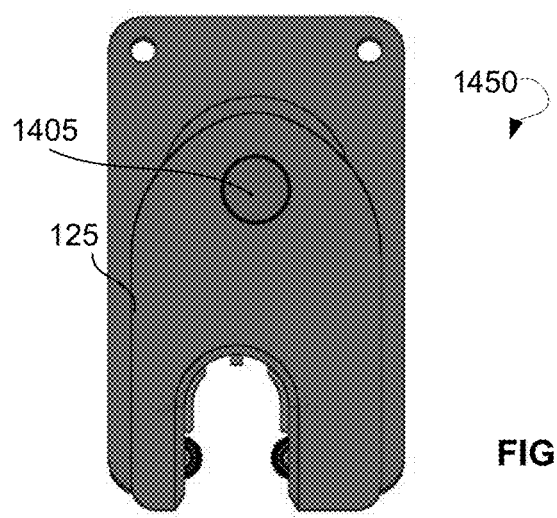
FIG. 14B is a front view of a docking unit, according to an example embodiment.
Figure 14C:
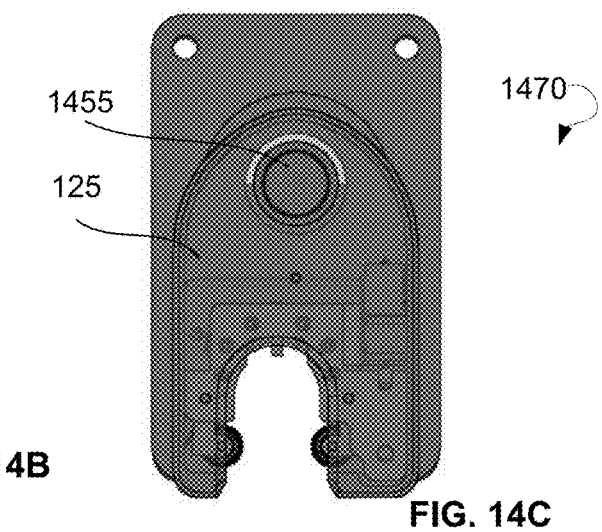
FIG. 14C is a front view of a docking unit, according to another example embodiment.

FIG. 14A is a side view 1400 of a docking unit 125 having a cutout 1305. FIG. 14B is a front view 1450 of a docking unit 125. The docking unit 125 may include an indicator 1405. FIG. 14C is a front view 1470 of a docking unit 125, according to another example embodiment. The docking unit 125 may include an indicator 1455.

Figure 15:
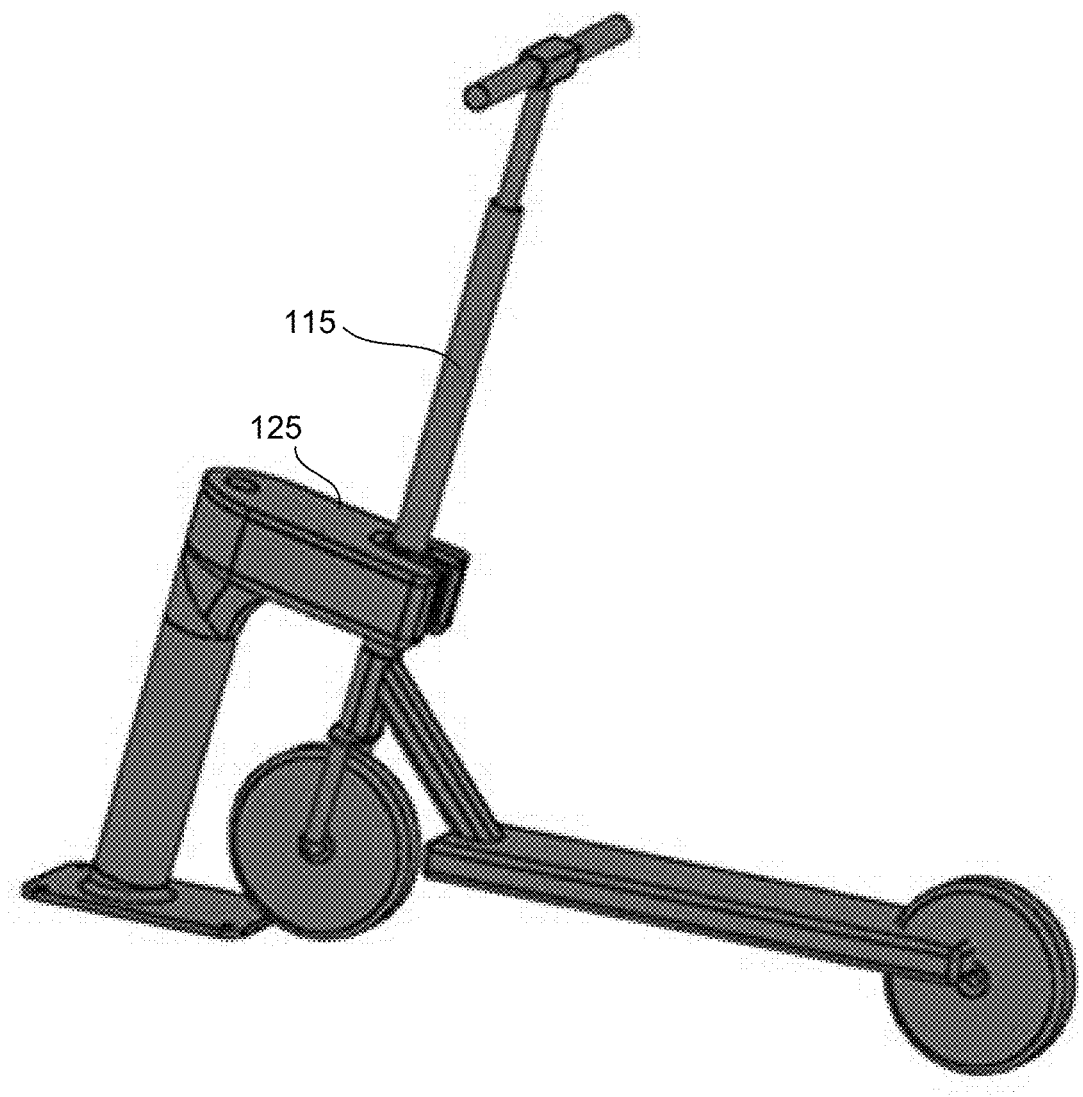
FIG. 15 is a general perspective view of a LEV docked with a docking unit, according to another example embodiment.

FIG. 15 is a general perspective view 1200 of a LEV 115 docked with a docking unit 125, according to another example embodiment. As shown in FIG. 12, the docking unit 125 has no cutouts for a front wheel of the LEV 115.

Figure 16:
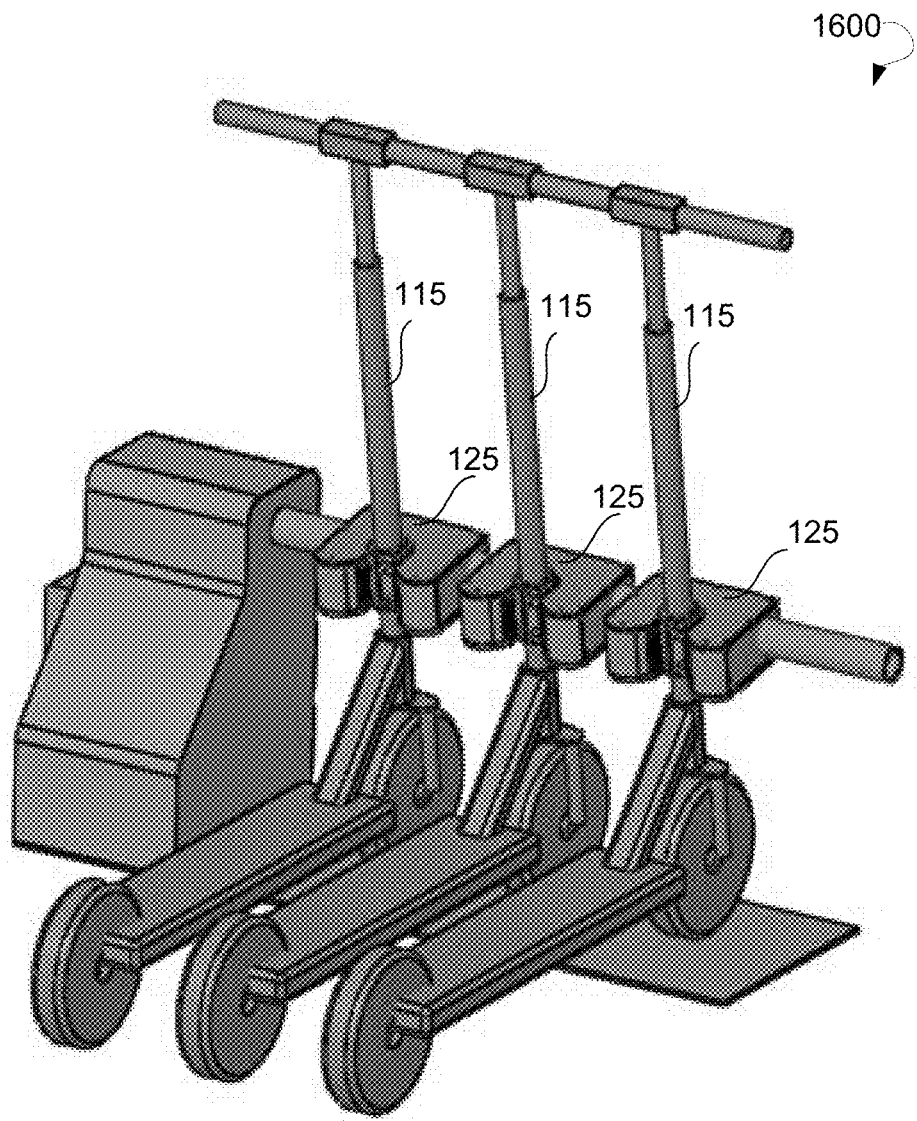
FIG. 16 is a general perspective view of a LEV docking station, according to an example embodiment.

FIG. 16 is a general perspective view of a LEV docking station 1600. The LEV docking station 1600 may have a plurality of docking units 125. A LEV 115 may be docked with each of the docking units 125. The LEV docking station 1600 may be used for parking LEVs 115.

Figure 17A:
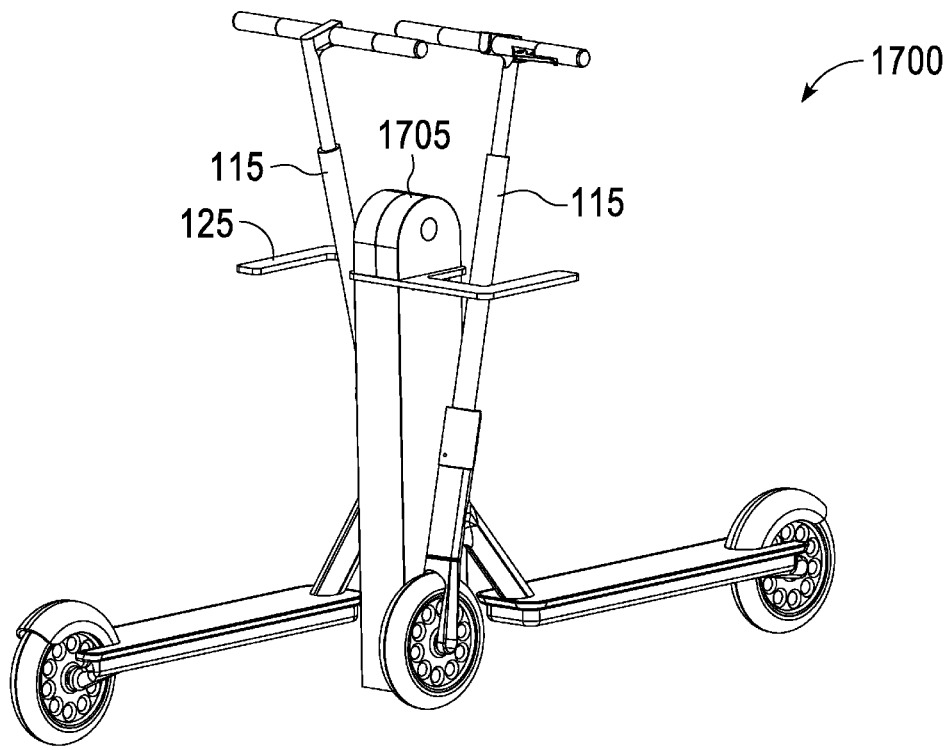
FIG. 17A is a front perspective view of a LEV docking station, according to an example embodiment.
Figure 17B:
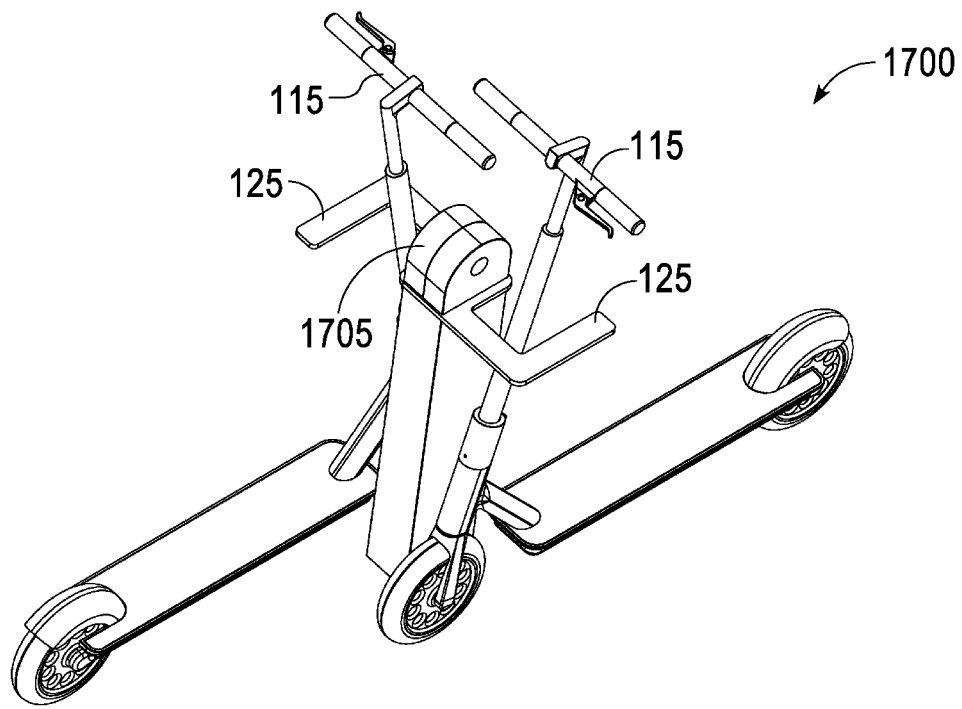
FIG. 17B is an upper perspective view of a LEV docking station, according to an example embodiment.

FIG. 17A is a front perspective view of a LEV docking station 1700, according to an example embodiment. The LEV docking station 1700 may include a docking bay 1705. The docking bay 1705 may have two docking units 125, each configured to position a LEV 115 antiparallel to one another (a "flip-flop" design of the LEV docking station 1700). FIG. 17B is an upper perspective view of a LEV docking station 1700 shown on FIG. 17A.

Figure 18A:
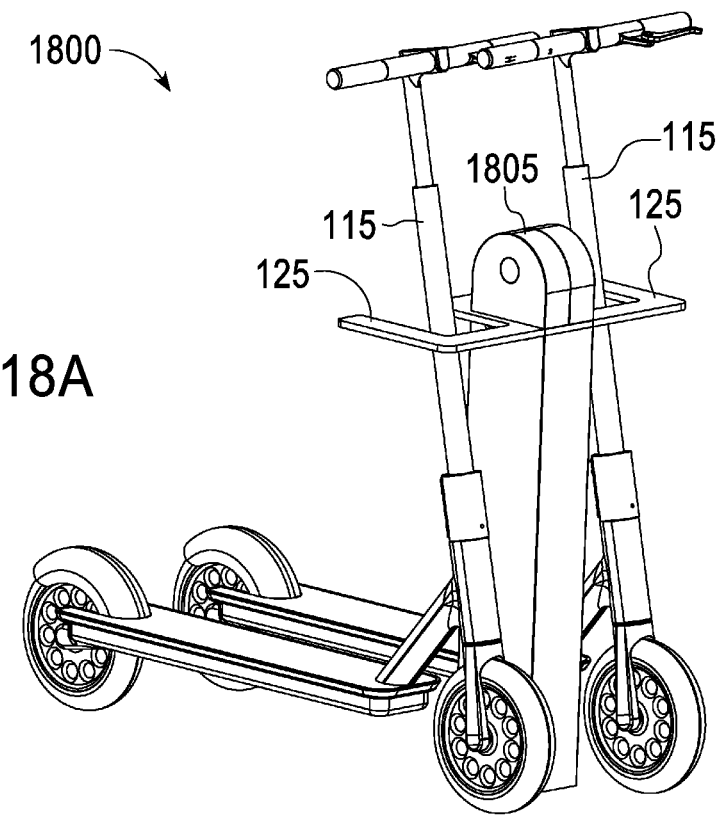
FIG. 18A is a front perspective view of a LEV docking station, according to an example embodiment.
Figure 18B:
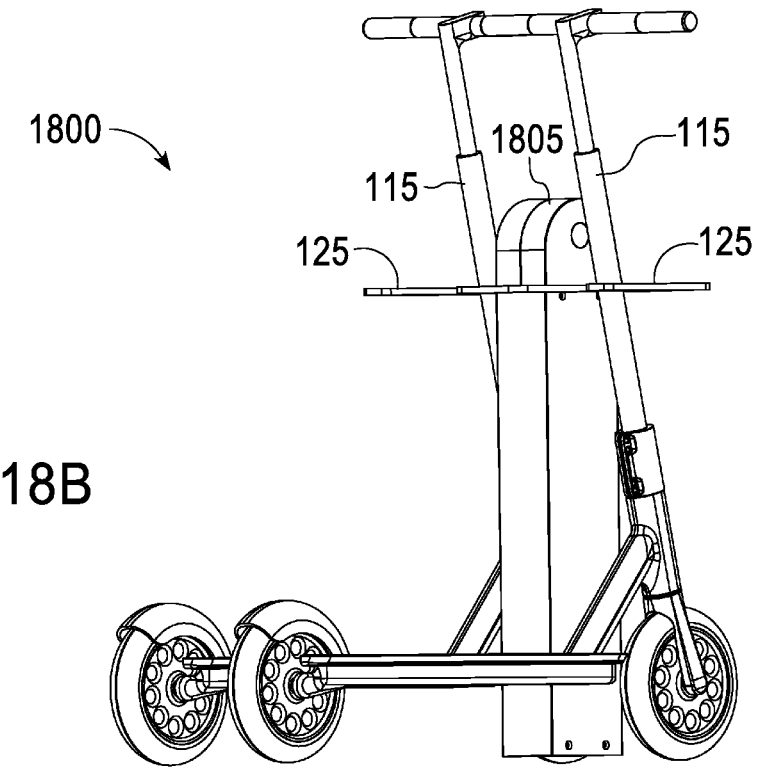
FIG. 18B is a rear perspective view of a LEV docking station, according to an example embodiment.

FIG. 18A is a front perspective view of a LEV docking station 1800, according to an example embodiment. The LEV docking station 1800 may have a docking bay 1805. The docking bay 1805 may have two docking units 125 each configured to position a LEV 115 parallel to one another (a "parallel" design of the LEV docking station 1800). FIG. 18B is a rear perspective view of a LEV docking station 1800 shown in FIG. 18A.

Figure 19B:
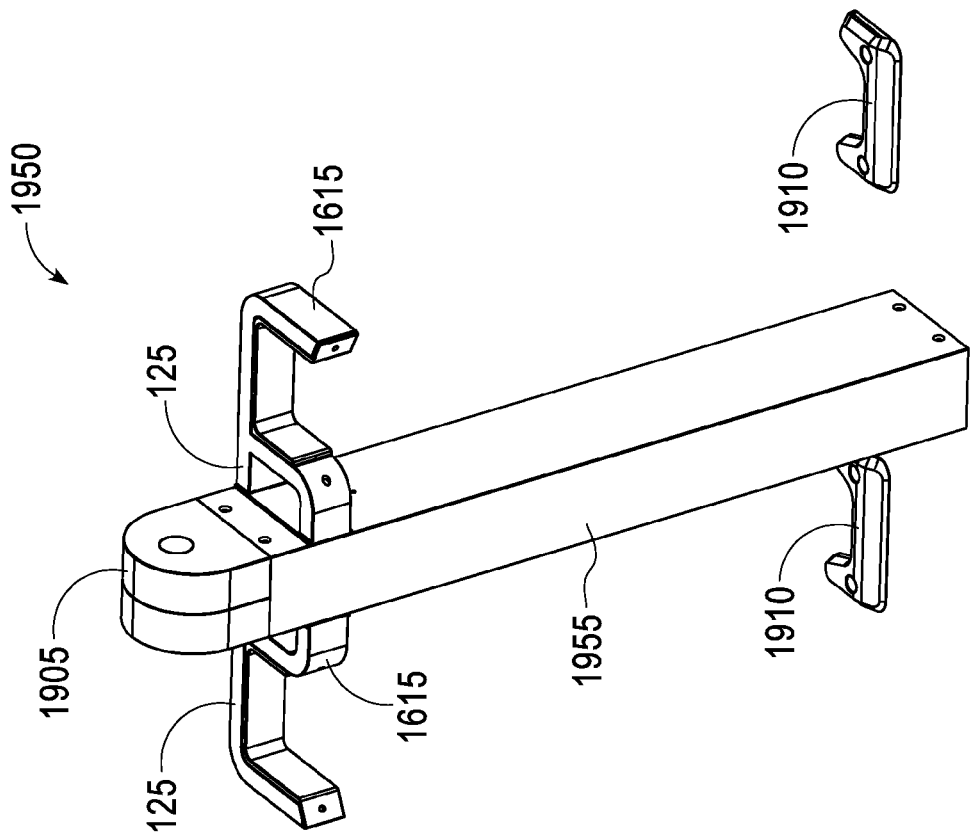
FIG. 19B is a schematic diagram of a LEV docking station with no LEVs docked, according to another example embodiment.
Figure 19A:
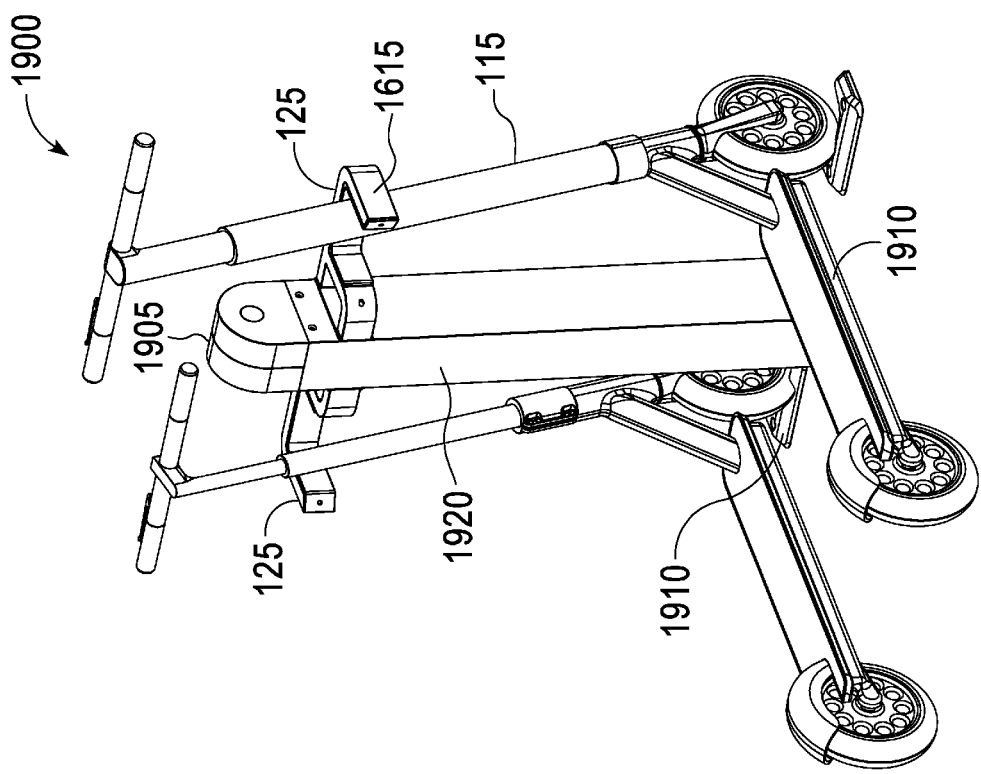
FIG. 19A is a schematic diagram of a LEV docking station with LEVs, according to an example embodiment.

FIG. 19A is a schematic diagram of a LEV docking station 1900 with LEVs, according to an example embodiment. The LEV docking station 1900 may include a plurality of docking bays 1905. The docking bay 1905 may have a support 1920 and a docking unit 125 connected to the support 1920. The support 1920 may be installed vertically. The docking unit 125 may include a docking member 1915 configured to reversibly receive a LEV 115. The LEV docking station 1900 may further include a wheel block 1910 for each LEV 115. The wheel block 1910 may be located in line with a bottom surface of wheels of the LEV 115 and configured to align the LEV in the docking unit 125 and orient the LEV in the docking unit 125 for optimizing the parking density. The wheel block 1910 may be further configured to limit a movement of the LEV 115 after the LEV 115 is docked with the docking unit 125, i.e. hold the LEV 115 in place. Optionally, the wheel block 1910 may be further configured to limit or set the allowable size of wheel that can fit in the docking bay 1905.

FIG. 19B is a schematic diagram of a LEV docking station 1950 with no LEVs docked, according to another example embodiment. The LEV docking station 1950 may have a plurality of docking bays 1905. The docking bay 1905 may have a support 1955 and a docking unit 125 connected to the support 1955. The support 1955 may be installed at an angle with respect to the ground.

Figures 20A, 20B:
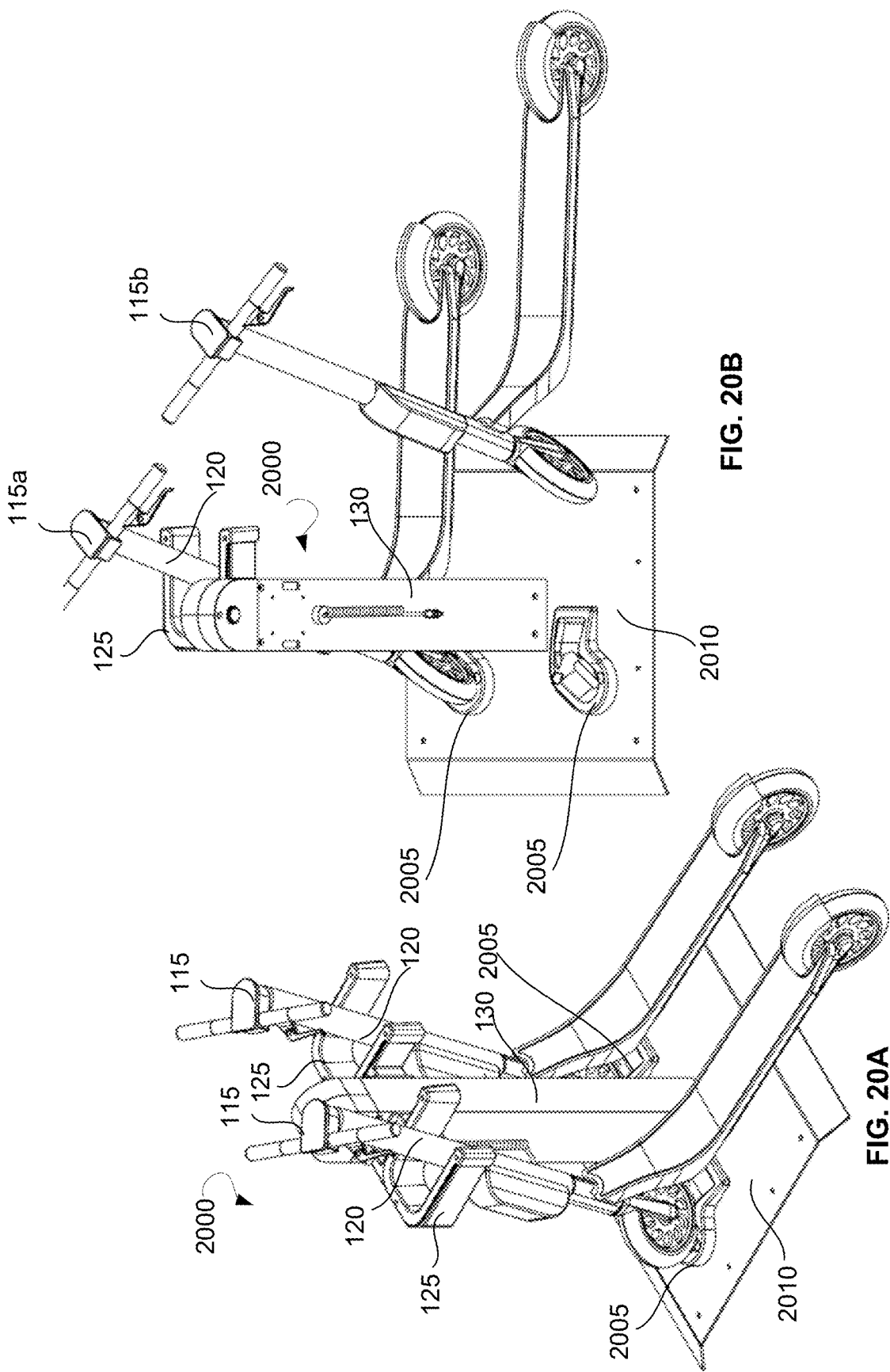
FIG. 20A is an overall perspective view of a LEV docking station having docking units and wheel blocks for each of LEVs, according to an example embodiment.
FIG. 20B is a side perspective view of a LEV docking station having docking units and wheel blocks for each of LEVs, according to an example embodiment.

FIG. 20A is an overall perspective view of a LEV docking station 2000 having docking units 125 and wheel blocks 2005 for each of LEVs 115, according to an example embodiment. The wheel block 2005 may be aligned with a bottom surface of wheels of the LEV 115. Optionally, the wheel block 2005 may be located on a base 2010. The base 2010 may be sized to accommodate the wheel block 2005, a support 130 of a charging station, and at least a front wheel of the LEV 115. The wheel block 2005 can be configured to align the LEV in the docking unit 125 and orient the LEV in the docking unit 125 for optimizing the parking density. The wheel block 2005 can be further configured to limit a movement of the LEV 115 after the LEV 115 is docked with the docking unit 125, i.e. hold the LEV 115 in place.

FIG. 20B is a side perspective view of a LEV docking station 2000 having docking units 125 and wheel blocks 2005 for each of LEVs 115, according to an example embodiment. FIG. 20B shows a first LEV 115a engaged with the wheel block 2005 and shows a second LEV 115b disposed on the base 2010 prior to engaging with the wheel block 2005. The wheel block 2005 is shown in detail in FIGS. 21A-21C.

FIG. 21A shows an upper view 2100 of a wheel block 2005, according to an example embodiment. FIG. 21B shows a front perspective view 2130 of a wheel block 2005. FIG. 21C shows a rear perspective view 2160 of a wheel block 2005. The wheel block 2005 may include a straight part 2105 and a curved part 2110. The curved part 2110 may be turned with respect to the straight part 2105, e.g., turned to the left as shown in FIGS. 21A-21C. The wheel block 2005 can have a projection 2115 on the periphery of both the straight part 2105 and the curved part 2110, a first recess 2120 in the middle portion of the straight part 2105 and a second recess 2125 in the middle portion of the curved part 2110.

When a user desires to engage the LEV with the wheel block 2005, the user can first place the front wheel of the LEV in front of an edge 2135 of the straight part 2105 of the wheel block 2005. Then, the user can push the handle bar of the LEV in order to advance the front wheel of the LEV forward. The force applied to the handle bar causes the front wheel to move over the projection 2115 and enter the first recess 2120 of the straight part 2105. Upon placing the front wheel into the first recess 2120, the user can move the handle bar of the LEV left (or right, e.g., the curved part 2110 can be turned to the right with respect to the straight part 2105) and simultaneously push the handle bar of the LEV to advance the front wheel of the LEV and have the front wheel pass from the first recess 2120 to the second recess 2125. In an example embodiment, the second recess 2125 may have a greater depth than the first recess 2120. Placing the front wheel of the LEV into the second recess 2125 of the wheel block 2005 can limit the movement of the front wheel. Furthermore, placing the front wheel of the LEV into the wheel block 2005 causes alignment of the LEV in the docking unit 125. Specifically, as shown in FIGS. 20A and 20B, the docking unit 125 is located substantially over the wheel block 2005. In some embodiments, the location of the docking unit 125 may be horizontally shifted with respect to the location of the wheel block 2005 to compensate for the angle of inclination of the headtube 120 of the LEV. Due to such position of the docking unit 125 and the wheel block 2005 with respect to each other, the headtube 120 of the LEV 115 is disposed in the docking unit 125 when the front wheel of the LEV 125 is placed into the wheel block 2005. Moreover, configuring the curved part 2110 angled with respect to the straight part 2105 of the wheel block 2005 can prevent the LEV 115 from backward, forward, and sideward movement in the wheel block 2005 after the LEV 115 is docked with a docking station equipped with the docking unit 125 and the wheel block 2005.

Figure 22B:
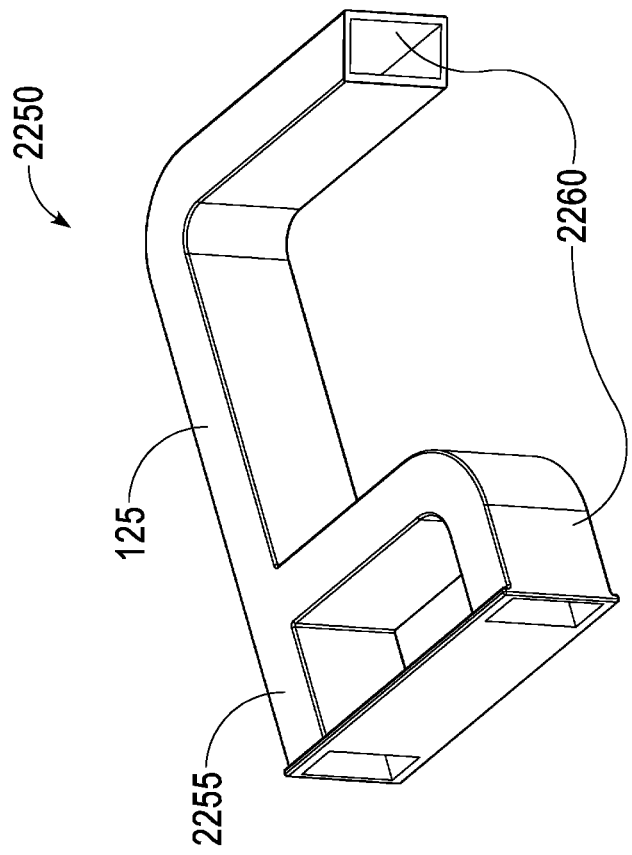
FIG. 22B is an enlarged view of the docking unit with no LEVs docked, according to an example embodiment.
Figure 22A:
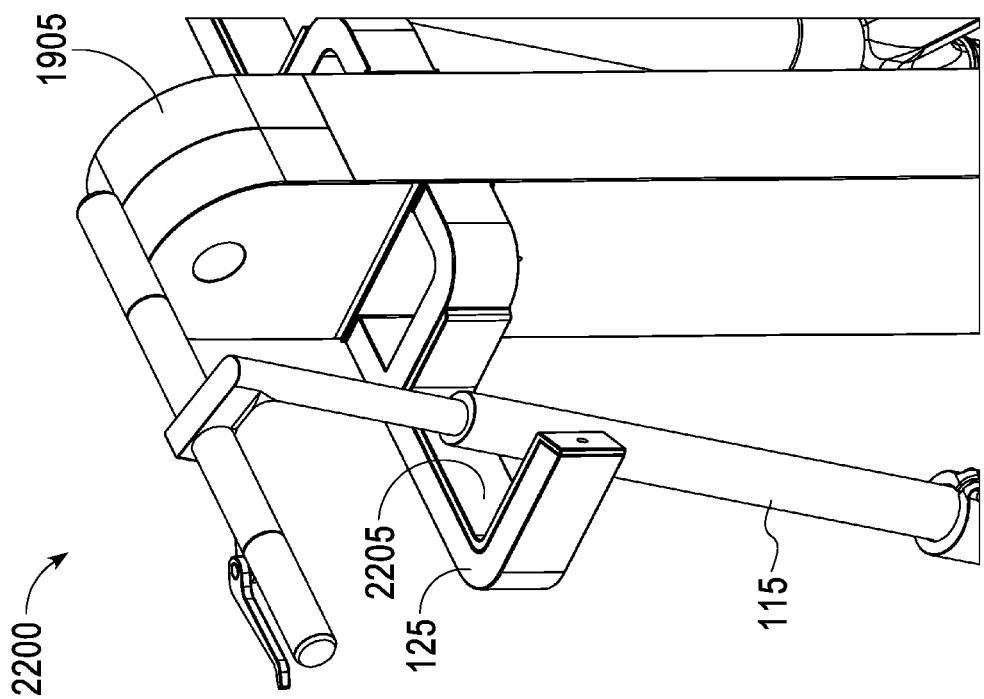
FIG. 22A is an enlarged view of the docking unit with a LEV docked with a docking unit, according to an example embodiment.

FIG. 22A is an enlarged view 2200 of the docking unit 125 with a LEV 115 docked with the docking unit 125. The docking unit 125 may have a bumper 2205. The bumper 2205 may be configured to reduce scratching of the LEV 115 and the docking unit 125 by serving as a cap for the docking unit 125.

FIG. 22B shows an enlarged view 2250 of the docking unit 125 with no LEVs docked. The docking unit 125 may include a hollow tubing 2255. The hollow tubing 2255 may include areas 2260 for a cable to be disposed inside the docking unit 125. In particular, a user may use the tubing 2255 to insert his own type of cable or other type of locks to lock the LEV into the docking unit 125 for security purposes.

Figure 23B:
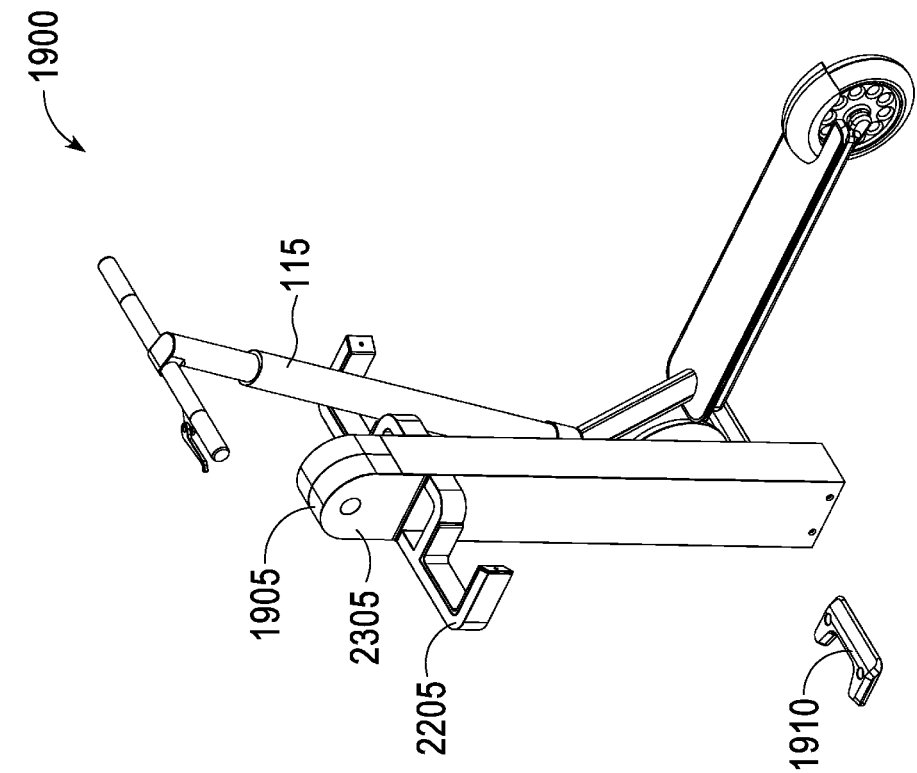
FIG. 23B is a top perspective view of a LEV docking station with no LEVs docked, according to another example embodiment.
Figure 23A:
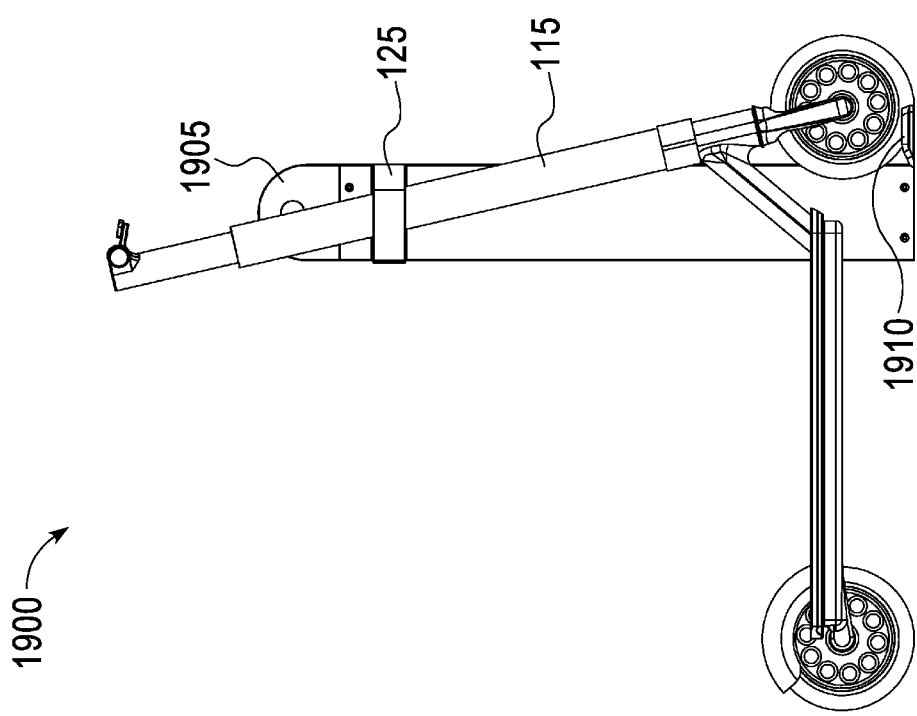
FIG. 23A is a side view of a LEV docking station with LEVs, according to an example embodiment.

FIG. 23A is a side view of a LEV docking station 1900 with LEVs as shown in FIG. 19A. The docking unit 125 may stop the LEV 115 from rolling forward. The wheel block 1910 may stop the LEV 115 from rolling backwards.

FIG. 23B is an upper perspective view of a LEV docking station 1900 with no LEVs docked, according to another example embodiment. The LEV docking station 1900 may include a label 2305 to cover screws. The wheel block 1910 may mimic the shape of the bumper 2205 to align the LEV 115 with the docking unit 125.

Figures 24A, 24B:
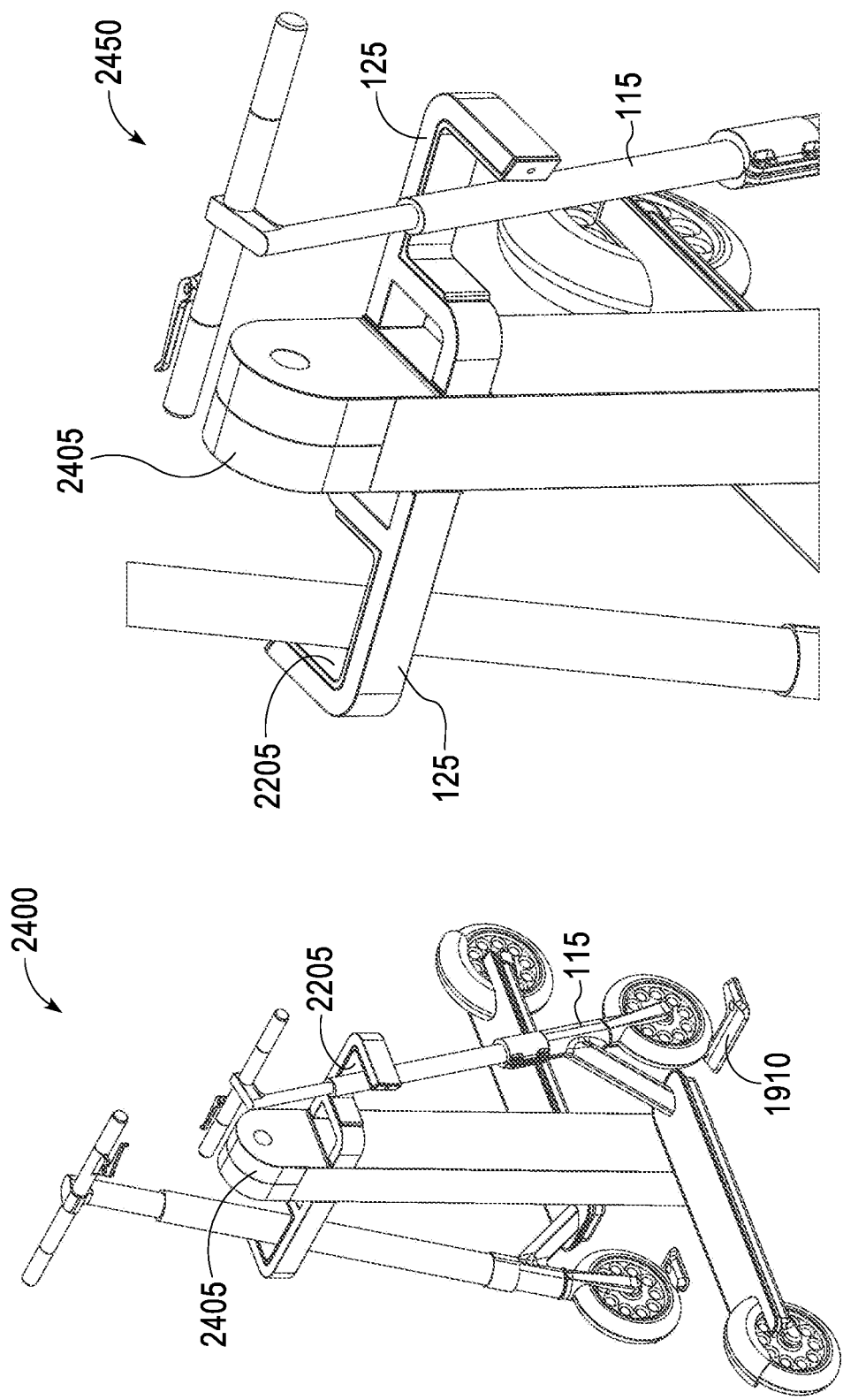
FIG. 24A is a top perspective view of a LEV docking station, according to an example embodiment.
FIG. 24B is an enlarged view of the LEV docking station, according to an example embodiment.

FIG. 24A is an upper perspective view of a LEV docking station 2400 having two docking bays 2405 with bumpers 2205 and wheel blocks 1910 and configured to position LEVs 115 antiparallel to one another (a "flip-flop" design), according to another example embodiment. FIG. 24B is an enlarged view 2450 of the LEV docking station 2400 showing docking bays 2405 and docking units 125 configured to position LEVs 115 antiparallel to one another.

Figure 25:
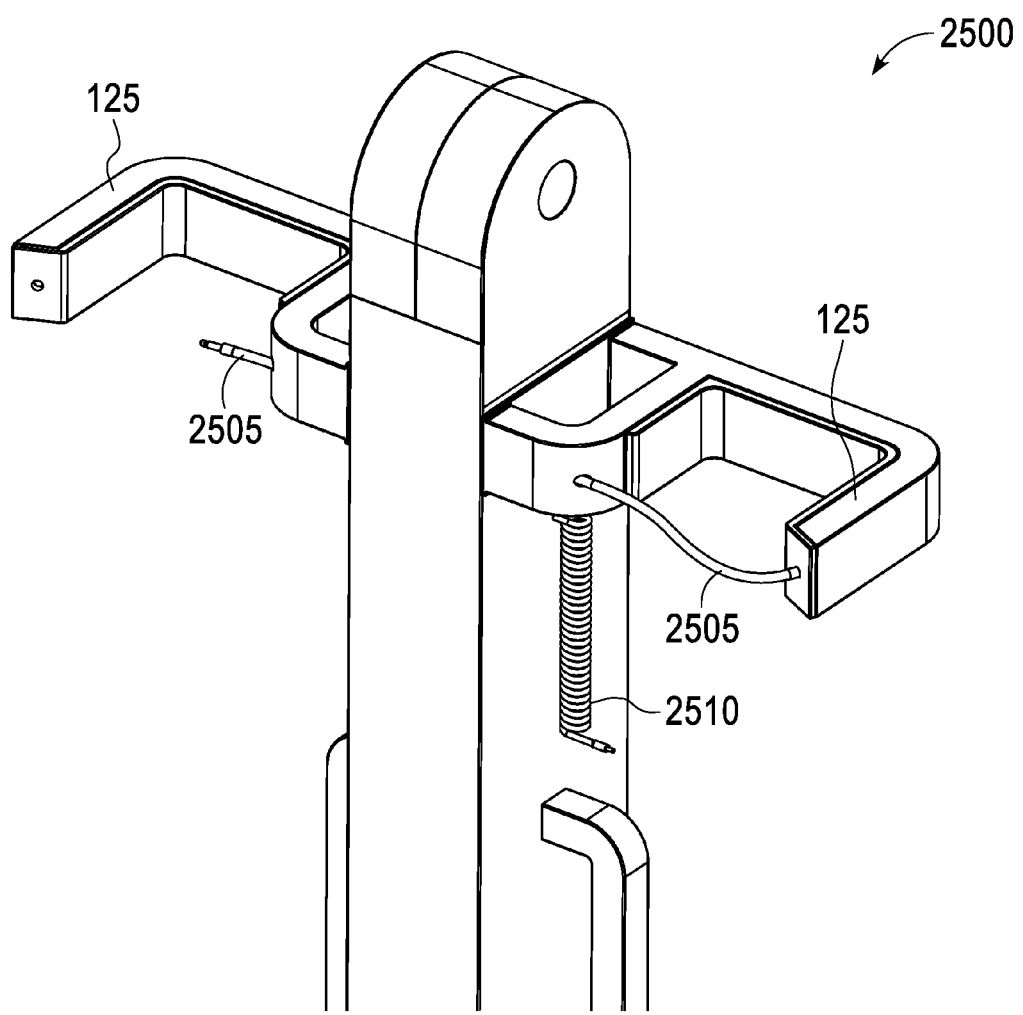
FIG. 25 is a schematic diagram of a LEV docking station, according to an example embodiment.

FIG. 25 is a schematic diagram of a LEV docking station 2500, according to an example embodiment. The LEV docking station 2500 may have docking units 125. Each docking unit 125 may have a locking mechanism 2505 configured to lock the LEV into the docking member of the docking unit 125. Each docking unit 125 may further include a charging adapter 2510 configured to operatively couple to a charging port of the LEV and to provide power to the LEV. In some example embodiments, the charging adapter may include a plug-in probe for plugging into the LEV. It should be noted that while some example LEV docking stations may only include locking mechanisms, some other example LEV docking stations may have only charging adapters, and yet some other example LEV docking stations may have both locking mechanisms and charging adapters.

The docking unit 125 of the LEV docking station 2500 may further include a processor and one or more sensors in communication with the processor. In an example embodiment, the LEV docking station 2500 may include a power board having a controller board. The controller board may enable a capacity expansion, i.e. adding multiple charge heads. The controller board is shown in detail in FIG. 31.

The one or more sensors may be configured to read one or more parameters associated with the LEV. The one or more parameters may be selected from a group comprising: a charge state of the LEV, a rate of a charge, a voltage, a current, a time, and so forth. The rate of charge may allow for determination of voltage and current present in the LEV. The LEV docking station 2000 may further include a boost convertor. The boost convertor may be configured to take an input voltage and boost the input voltage to a predetermined level based on the one or more parameters associated with the LEV to be charged.

Figure 26A:
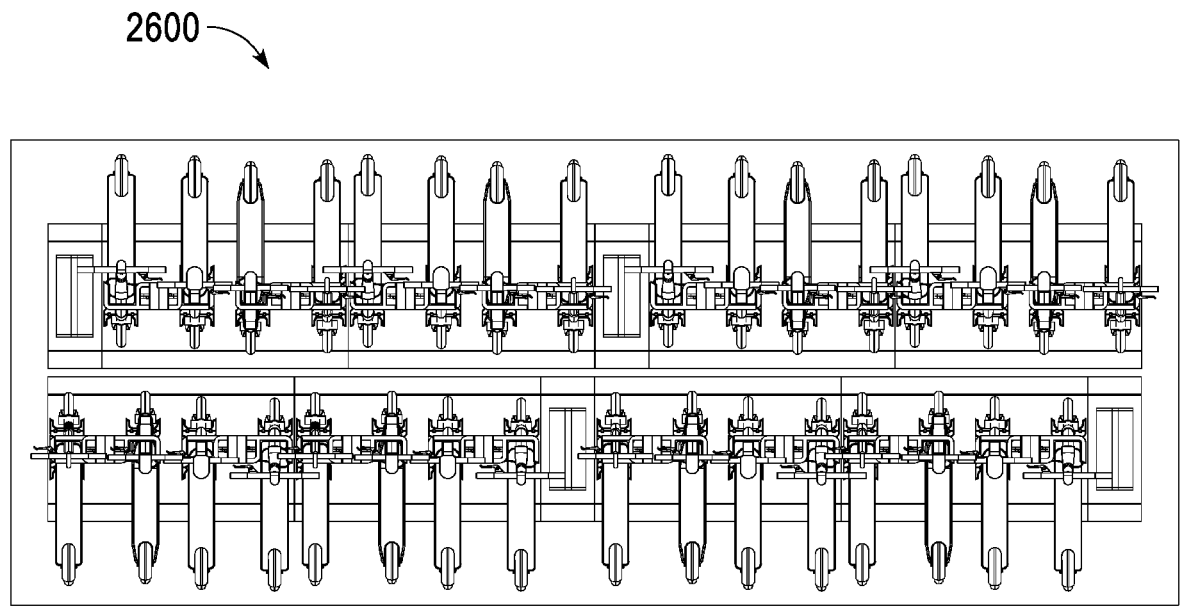
FIG. 26A is an upper view of a LEV docking station with a plurality of docking bays for LEVs, according to an example embodiment.
Figure 26B:
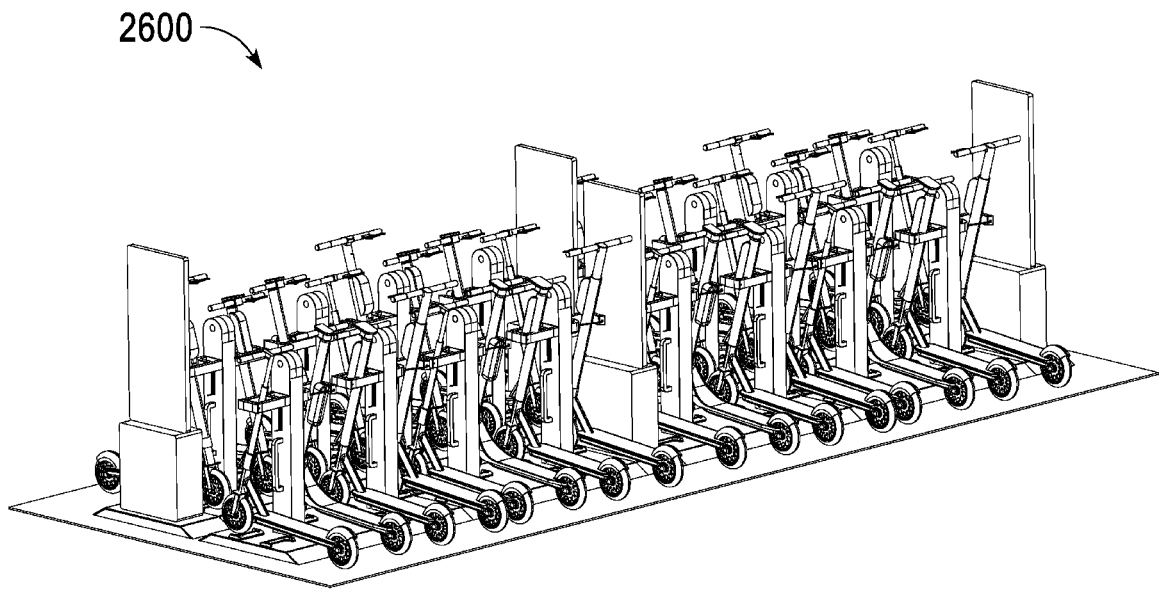
FIG. 26B is a front perspective view of a LEV docking station with a plurality of docking bays for LEVs, according to an example embodiment.

FIG. 26A is an upper view of a LEV docking station 2600 with a plurality of docking bays for LEVs, according to an example embodiment. FIG. 26B is a front perspective view of a LEV docking station 2600 with a plurality of docking bays for LEVs, according to an example embodiment.

Figure 27A:
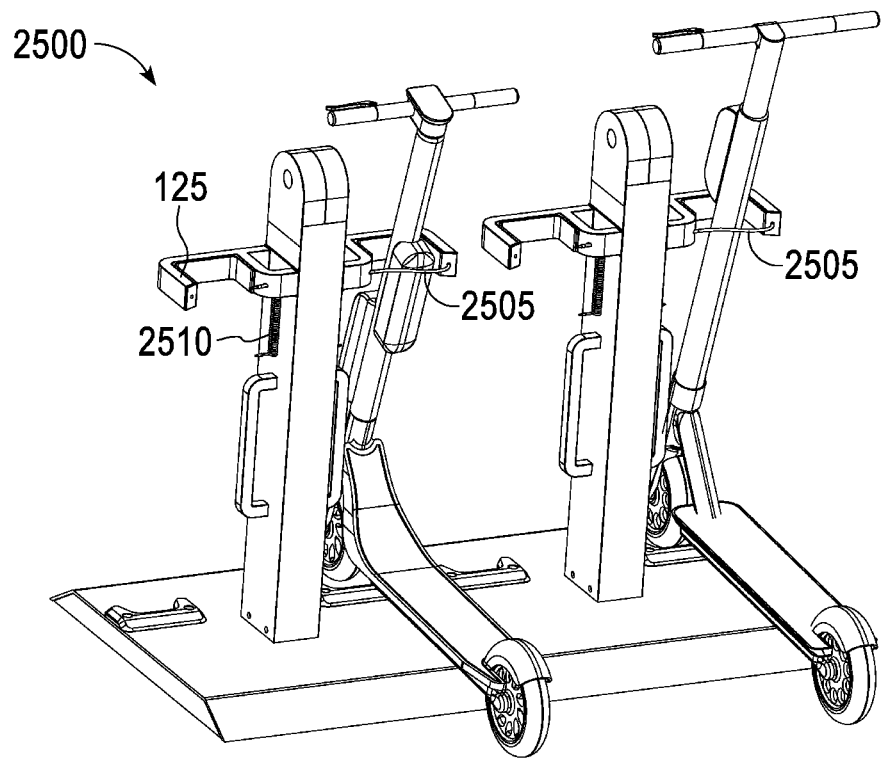
FIG. 27A is a rear perspective view of a LEV docking station, according to an example embodiment.
Figure 27B:
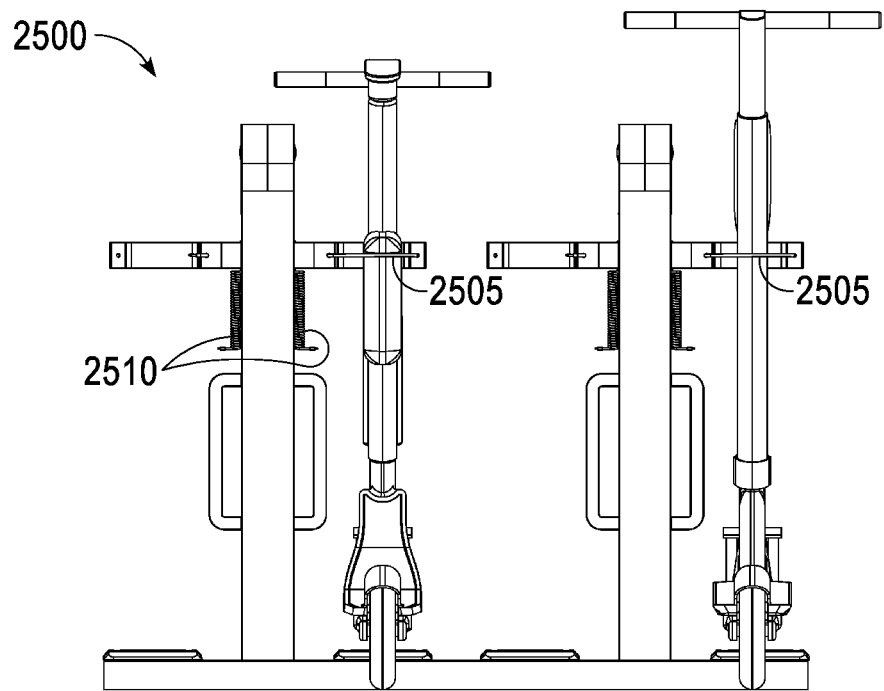
FIG. 27B is a rear view of a LEV docking station, according to an example embodiment.

FIG. 27A is a rear perspective view of a LEV docking station 2500 shown in FIG. 25. The LEV docking station 2500 may include a locking mechanism 2505 configured to lock the LEV into the docking member of the docking unit 125. The LEV docking station 2500 may further include a charging adapter 2510 configured to operatively couple to a charging port of the LEV and to provide power to the LEV. FIG. 27B is a rear view of a LEV docking station 2500 shown in FIG. 25.

Figure 28A:
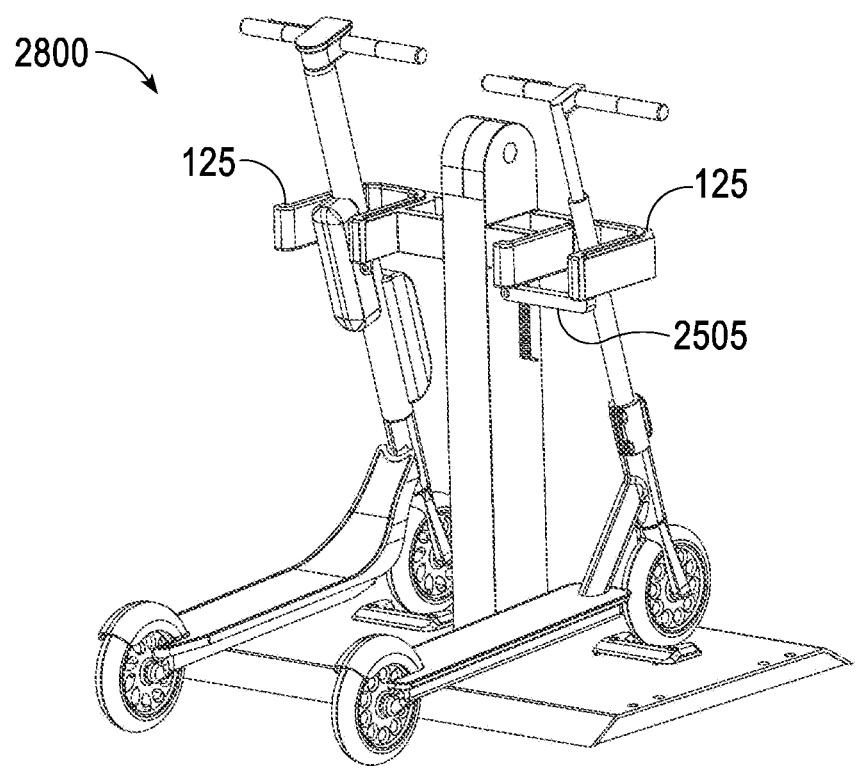
FIG. 28A is a rear perspective view of a LEV docking station, according to another example embodiment.
Figure 28B:
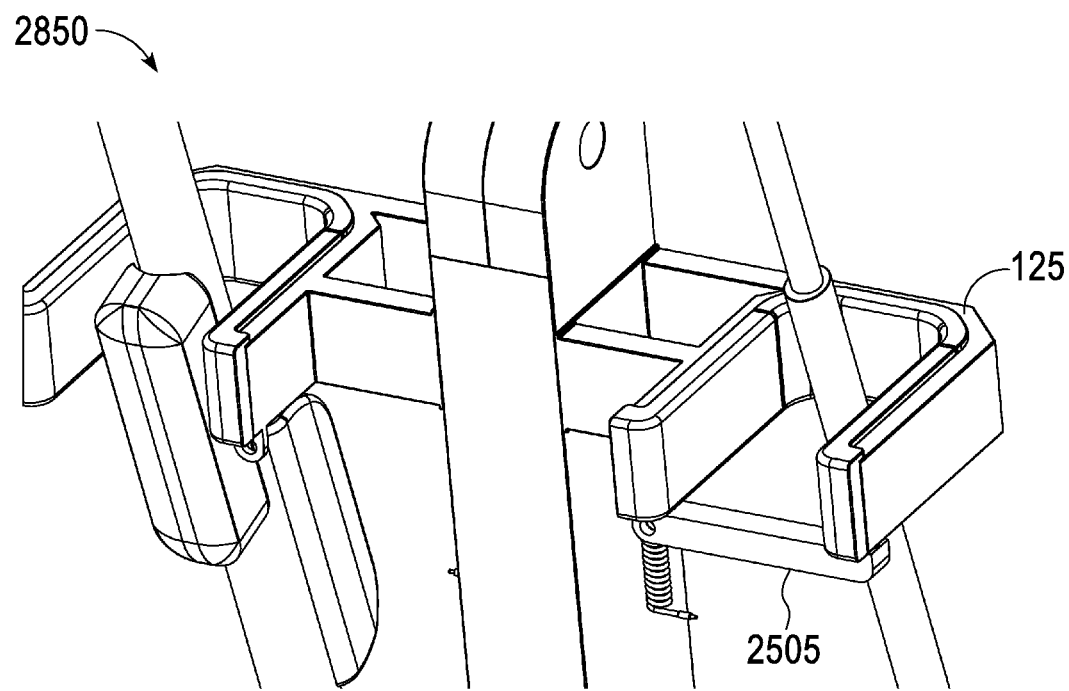
FIG. 28B is an enlarged view of the docking unit of the LEV docking station, according to an example embodiment.

FIG. 28A is a rear perspective view of a LEV docking station 2800, according to another example embodiment. The LEV docking station 2800 may have a locking mechanism 2505 configured to lock the LEV into the docking member of the docking unit 125. FIG. 28B shows an enlarged view 2850 of the docking unit 125 of the LEV docking station 2800 shown in FIG. 28A.

Figure 29A:
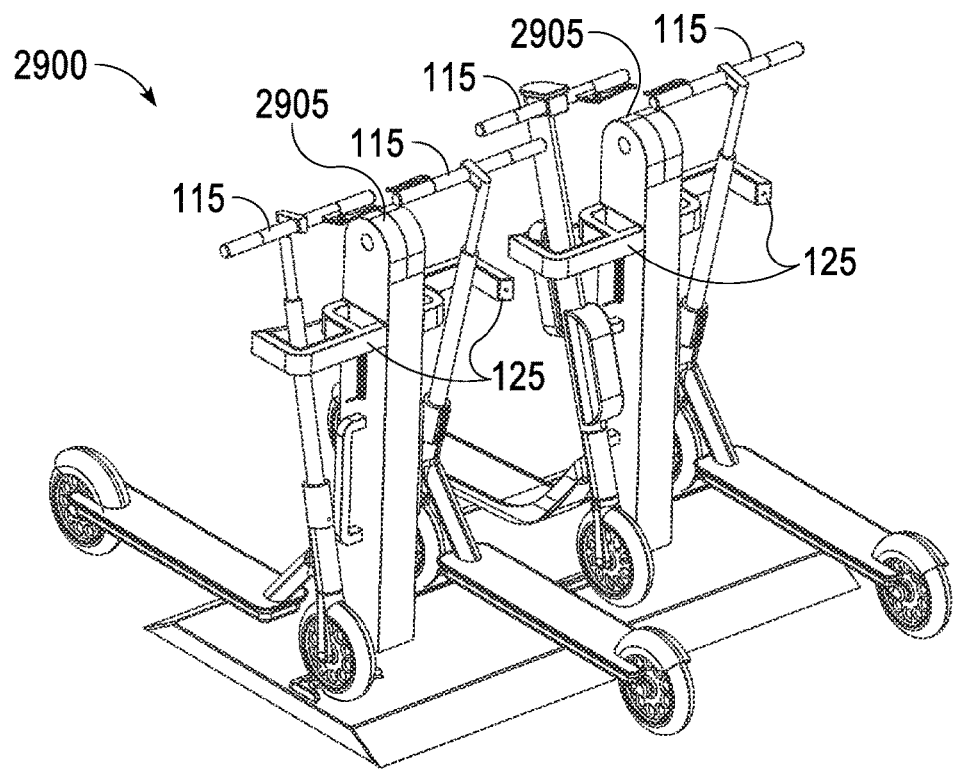
FIG. 29A is a perspective view of a LEV docking station, according to an example embodiment.

FIG. 29A shows a perspective view of a LEV docking station 2900. The LEV docking station 2900 includes two docking bays 2905, each having two docking units 125 configured to position adjacent LEVs antiparallel to one another (a "flip-flop" design).

Figure 29B:
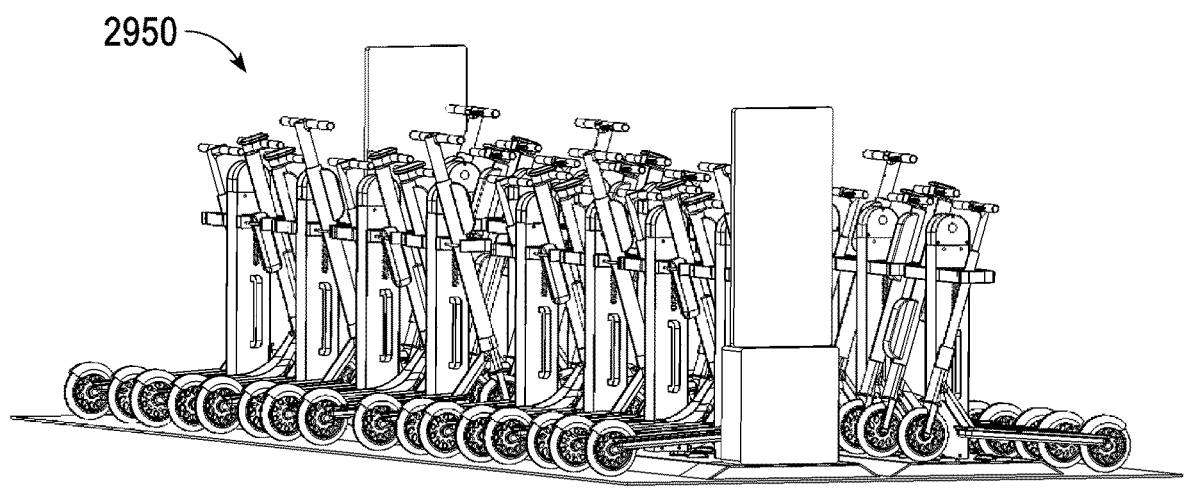
FIG. 29B is a front perspective view of a LEV docking station, according to an example embodiment.

FIG. 29B is a front perspective view of a LEV docking station 2950 with a plurality of docking bays for LEVs to be positioned antiparallel to one another, according to an example embodiment.

Figure 30:
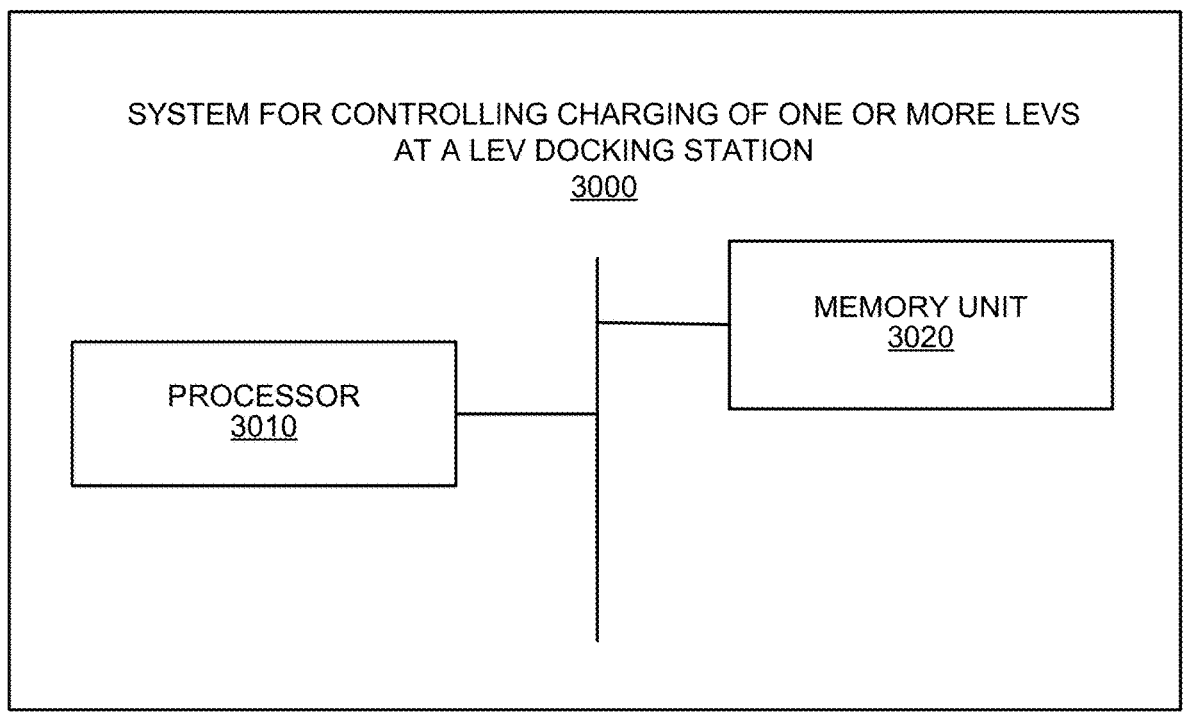
FIG. 30 is a block diagram showing a system for controlling charging of one or more LEVs at a LEV docking station, according to an example embodiment.

FIG. 30 is a block diagram showing a system 3000 for controlling charging of one or more LEVs at a LEV docking station. The system 3000 may include a processor 3010 in communication with one or more docking units of the LEV docking station and a memory unit 3020 in communication with the processor 3010 and configured to store instructions executable by the processor 3010. The processor 3010 may be configured to determine a presence of a LEV connected to one of the one or more docking units and identify parameters associated with the LEV. In an example embodiment, the identifying of the parameters associated with the LEV may include detecting an electronic signature of the LEV. The electronic signature may be associated with a manufacturer of the LEV. Specifically, the electronic signature may be characteristic of a LEV design developed by a manufacturer. The processor 3010 may be configured to determine at least a type of the LEV based on the electronic signature. The parameters include one or more of the following: a type of the LEV, a battery type of the LEV, a charge level, a number of cells in a battery of the LEV, and a charge voltage of the battery of the LEV, and so forth. Furthermore, the processor 3010 may use the measurements of a voltage, a current, and a time to determine what type of LEV is connected to each docking bay and whether the LEV is charged or needs charging. If the LEV is charged, the processor does not supply power to the LEV to avoid shorts, electrolysis, and even explosions.

The processor 3010 may be configured to determine/calculate a charge voltage of the LEV based on the parameters. The processor 3010 may be configured to develop a charging profile for the LEV based on the charge voltage and the parameters. The processor 3010 may be further configured to instruct the one of the one or more docking units to supply power to the LEV based on the charging profile. Based on the charge voltage and the parameters, the processor may measure how much power it takes to completely charge the LEV.

In an example embodiment, the processor 3010 may be further configured to determine a failure of a battery of the LEV. Based on the determination, the processor 3010 may stop supplying the power to the LEV. The processor 3010 may further notify a user associated with the LEV of the failure, e.g., by sending a notification to an application running on a user device associated with the user. The application may be in communication with the system 3000. The system 3000 may further include one or more of hardware control, communication control, and charge control. The system 3000 may act as a backend platform having one or more of an administrative panel, customer portal, and user portal.

In an example embodiment, the processor 3010 can be further configured to determine whether there are empty docking units for parking LEVs and notify the user of the availability/unavailability of the docking units. Furthermore, the processor 3010 may determine whether the docking units have sufficient power for charging LEVs and provide the information to the user via an application running on a user device.

In an example embodiment, the processor 3010 may be further configured to determine that a plurality of LEVs are connected to the one or more docking units. Based on the determination, the processor 3010 may determine a charge level of each of the plurality of LEVs. The processor 3010 may further determine a charge state of one or more power sources associated with the one or more docking units. Based on the charge level and the charge state, the processor 3010 may selectively supply a higher level of power to one or more of the LEVs having a lower charge level and selectively supply a lower level of power to one or more of the LEVs having a higher charge level. The processor 3010 may determine parameters associated with each of the plurality of LEVs. The higher level of power and the lower level of power may be determined for the one or more of the LEVs based on the parameters associated with each of the plurality of LEVs. The parameters associated with each of the plurality of LEVs may include one of more of the following: a battery temperature, a voltage, a current, a battery age, a rate at which the LEV consumes power, and so forth.

Therefore, the processor 3010 may perform smart power management of the LEV and load balancing for the batteries being charged by distributing power to at least charged LEVs. The smart power management performed by the system 3000 is also referred to herein as "throttling." The power is distributed based on various parameters, such as a temperature, voltage, current, and time (age of batteries, as the batteries lose power as they age), rate at which the LEV takes power. When LEVs are close to full charge, power may be reduced to those LEVs.

The purpose of supplying the lower or higher power is to optimize performance of the storage batteries in the charging system and/or optimize the efficiency of charge delivery to the LEVs. Specifically, the supply of power available in the battery storage of the charging system to the LEV may be smartly balanced among the LEVs. For example, if the battery storage is a solar powered system and it has been cloudy for a few days, the charging system may not be fully regenerating the storage batteries. Hence, the charging system may not have enough power to change the LEVs completely and may need to throttle back (i.e., reduce) the amount of the power that the charging system provides to LEVs, but may still balance the supplying of power among the LEVs to increase the charge level of each of the LEVs connected.

Figure 31:
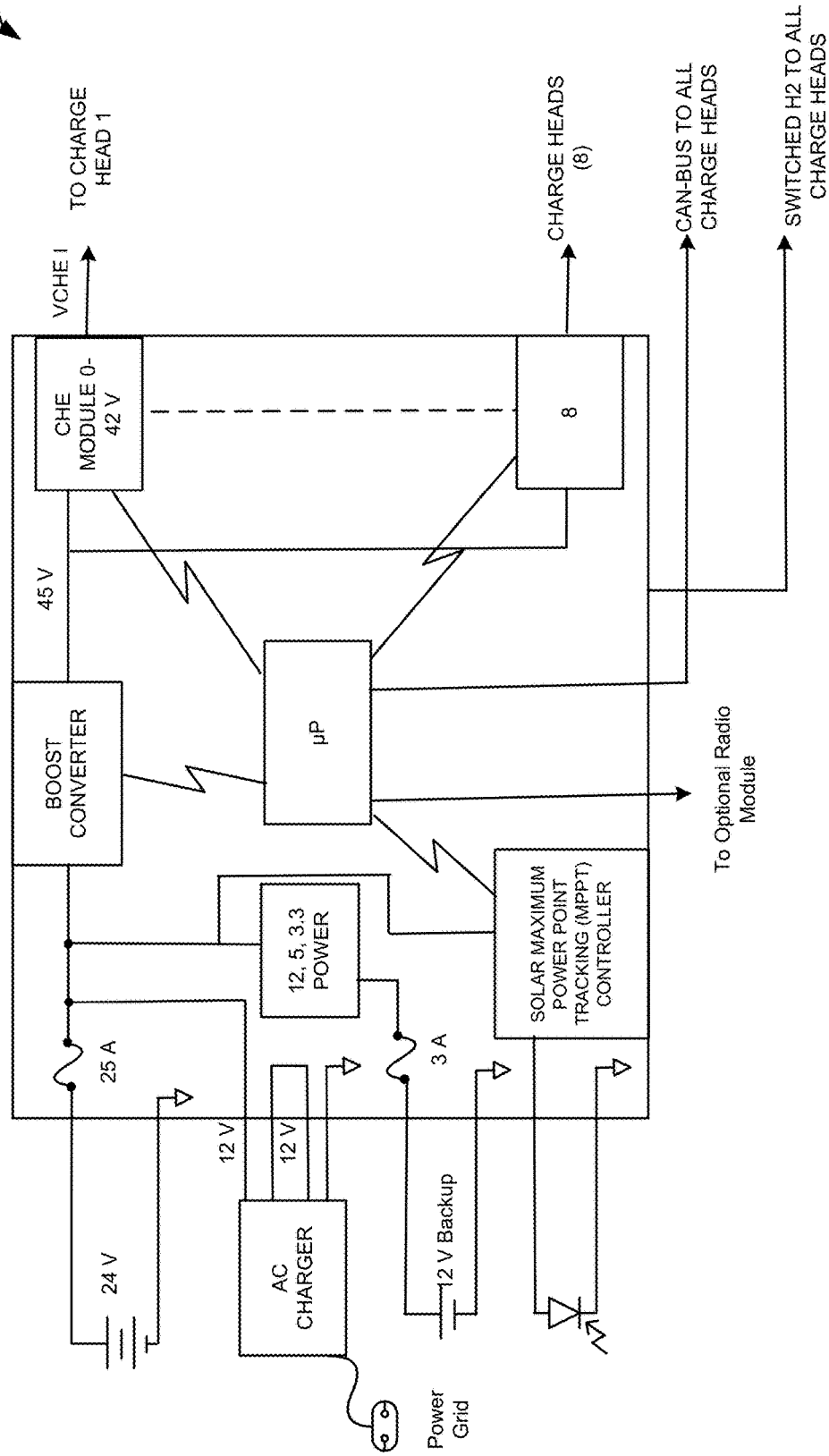
FIG. 31 shows a block diagram of a power board, according to an example embodiment.
Figure 32:
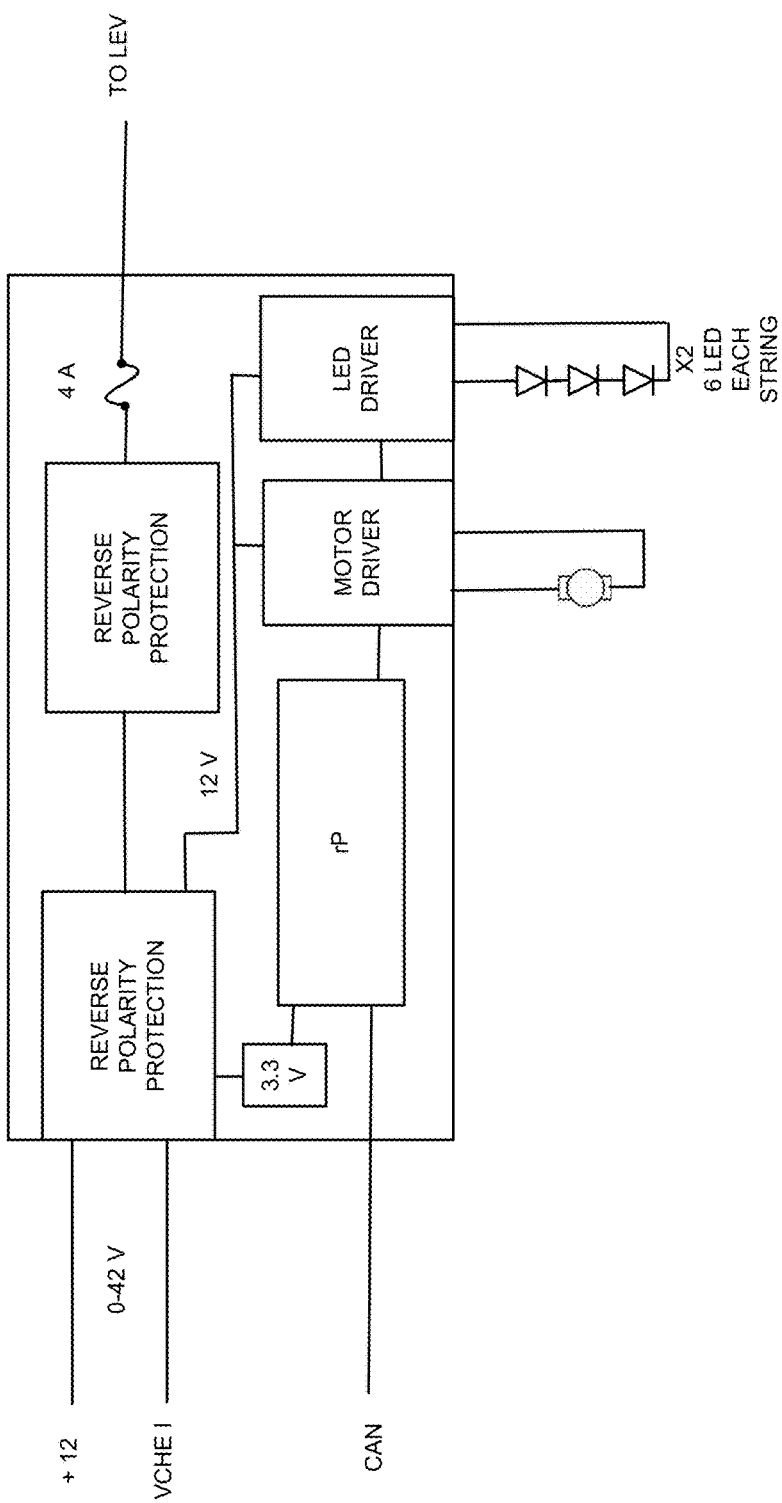
FIG. 32 is a block diagram of a charge head board, according to an example embodiment.

FIG. 31 shows a block diagram of a power board 3100 having a controller board, according to an example embodiment. FIG. 32 shows a block diagram of a charge head board 3200, according to an example embodiment. The system for controlling charging of one or more LEVs may include the power board 3100 and the charge head board 3200. The charge head board 3200 may control locking units and sensors and control a predetermined number of charge heads, e.g., up to eight charge heads. The charge heads may be associated with charging adapters of docking units operatively coupled to a charging port of the LEV and providing power to the LEV.

Figure 33:
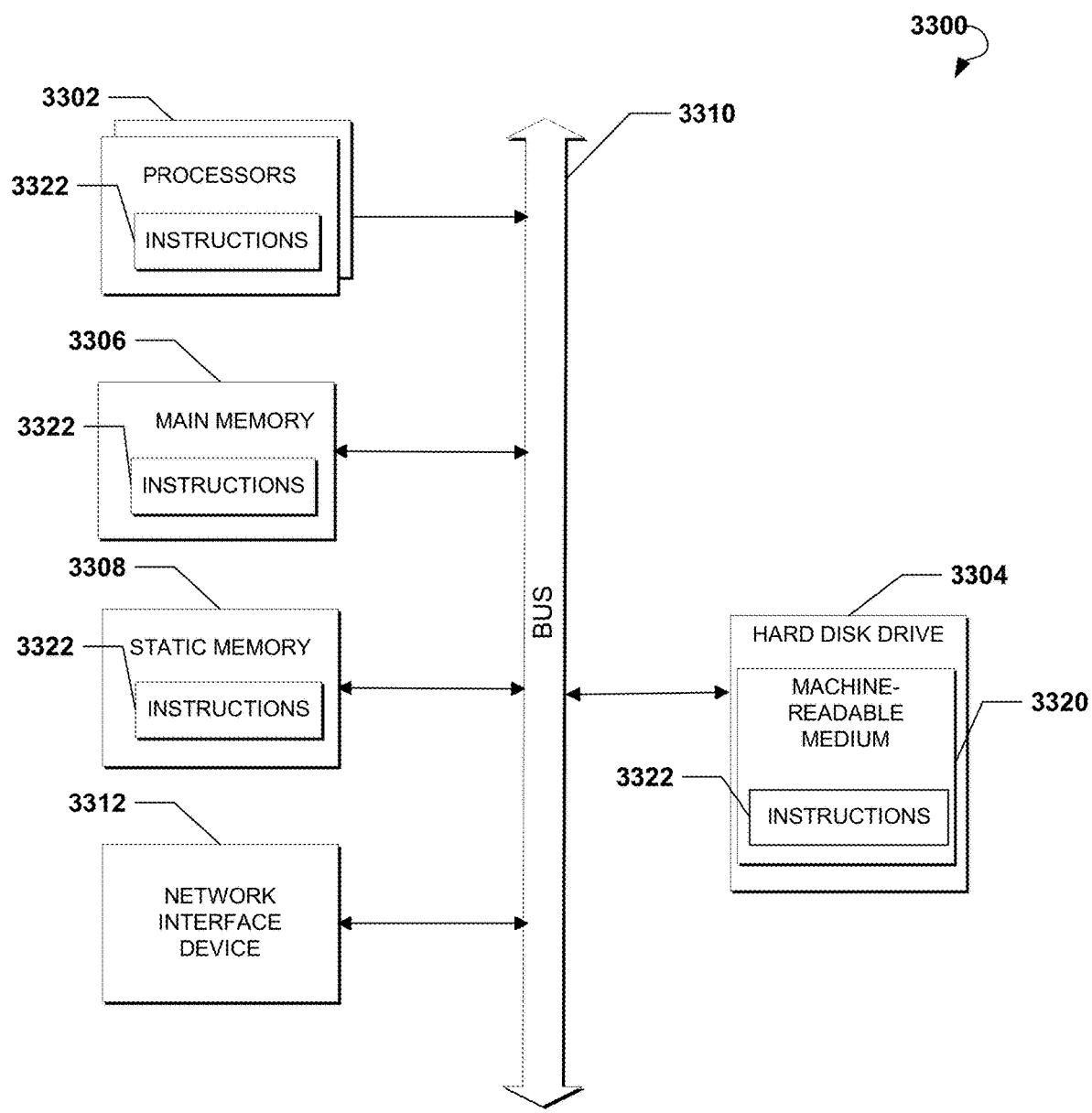
FIG. 33 is a computing system that can be used to implement a method for development of concentration, according to an example embodiment.

FIG. 33 shows a diagrammatic representation of a computing device for a machine in the exemplary electronic form of a computer system 3300, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a field programmable gate array, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 3300 may include a processor or multiple processors 3302, a hard disk drive 3304, a main memory 3306 and a static memory 3308, which communicate with each other via a bus 3310. The computer system 3300 may also include a network interface device 3312. The hard disk drive 3304 may include a computer-readable medium 3320, which stores one or more sets of instructions 3322 embodying or utilized by any one or more of the methodologies or functions described herein. The instructions 3322 can also reside, completely or at least partially, within the main memory 3306 and/or within the processors 3302 during execution thereof by the computer system 3300. The main memory 3306 and the processors 3302 also constitute machine-readable media.

While the computer-readable medium 3320 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, Read-Only Memory, and the like.

The example embodiments described herein may be implemented in an operating environment comprising software installed on a computer, in hardware, or in a combination of software and hardware.

Thus, universal charging systems, LEV docking stations, and systems for controlling charging of one or more LEVs at a LEV docking station have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A universal charging system comprising:
   a charging adapter configured to be mounted on a light electric vehicle (LEV), the charging adapter comprising:
      electrical contacts for docking with a charging station; and
      a charging interface for supplying power from the charging station to a battery of the LEV; and
   the charging station comprising:
      at least one docking unit for receiving the charging adapter of the LEV, the at least one docking unit comprising:
         further electrical contacts for connecting to the charging adapter of the LEV; and
         at least one wheel block including a straight part and a curved part, the straight part and the curved part being configured to rest on a ground surface, the curved part being angled with respect to the straight part, wherein the curved part is configured to receive a front wheel of the LEV after the front wheel is advanced through the straight part; and
      a processor for controlling charging of the LEV, wherein the processor is configured to determine, upon the receiving the charging adapter of the LEV by the at least one docking unit, at least a type of the battery of the LEV, and to control the supplying of the power from the charging station to the battery of the LEV based on the type of the battery.

2. The system of claim 1, wherein the charging station further comprises a locking mechanism configured to lock the LEV into the at least one docking unit.

3. The system of claim 1, wherein the charging station further comprises an indicator configured to show a charge status of the LEV.

4. The system of claim 1, wherein the charging station further comprises a backend platform in communication with the processor, the backend platform comprising one or more of an administrative panel, a customer portal, and a user portal.

5. The system of claim 1, wherein the charging adapter further comprises a cable for wiring with a charging port of the LEV.

6. The system of claim 1, wherein the at least one docking unit further comprises spring roller grippers configured to grip the charging adapter of the LEV.

7. The system of claim 1, wherein the charging adapter further comprises an ID chip associated with the LEV, the ID chip storing an identifier associated with the LEV, wherein the processor is configured to store the identifier into a memory unit.

8. A light electric vehicle (LEV) docking station comprising a plurality of docking bays, each of the plurality of docking bays comprising:
   a docking unit comprising:
      a docking member configured to reversibly receive a LEV; and
   at least one wheel block having a projection extending upward with respect to a ground surface, the at least one wheel block including a straight part and a curved part, the straight part and the curved part being configured to rest on the ground surface, the curved part being angled with respect to the straight part, wherein the curved part is configured to receive a front wheel of the LEV after the front wheel is advanced through the straight part;
   the at least one wheel block being configured to:
      align the LEV in the docking unit; and
      prevent the front wheel of the LEV from rolling backwards after the LEV is docked with the docking unit upon advancing the front wheel forward with respect to the projection until the projection is behind the front wheel.

9. The LEV docking station of claim 8, wherein the docking unit further comprises at least one of the following:
   a locking mechanism configured to lock the LEV into the docking member; and
   a charging adapter configured to operatively couple to a charging port of the LEV and to provide power to the LEV.

10. The LEV docking station of claim 9, wherein the docking unit further comprises a processor and one or more sensors in communication with the processor.

11. The LEV docking station of claim 10, wherein the one or more sensors are configured to read one or more parameters associated with the LEV, the one or more parameters being selected from a group comprising a charge state of the LEV, a rate of charge, a voltage, a current, and a time.

12. The LEV docking station of claim 11, further comprising a boost convertor, the boost convertor being configured to boost an input voltage to a predetermined level based on the one or more parameters associated with the LEV.

13. The LEV docking station of claim 9, wherein the charging adapter includes a plug-in probe for plugging into the LEV.

14. The LEV docking station of claim 9, wherein the docking unit is configured to connect to one or more power sources, the one or more power sources being selected from an electric grid, a solar power source, a self-generating power source, and a battery storage.

* * * * *